(12) United States Patent
Li

(10) Patent No.: US 12,128,622 B2
(45) Date of Patent: Oct. 29, 2024

(54) FLEXIBLE TRANSPARENT HEATER FOR ADDITIVE MANUFACTURING DEVICE

(71) Applicant: FORCAST RESEARCH & DEVELOPMENT CORP., Prince George (CA)

(72) Inventor: Si Wan Li, North Vancouver (CA)

(73) Assignee: FORCAST RESEARCH & DEVELOPMENT CORP., Prince George (CA)

(*) Notice: Subject to any disclaimer, the term of this patent is extended or adjusted under 35 U.S.C. 154(b) by 0 days.

(21) Appl. No.: 17/554,756

(22) Filed: Dec. 17, 2021

(65) Prior Publication Data
US 2022/0297377 A1 Sep. 22, 2022

Related U.S. Application Data

(60) Provisional application No. 63/163,722, filed on Mar. 19, 2021.

(51) Int. Cl.
*B29C 64/295* (2017.01)
*B29C 64/255* (2017.01)
(Continued)

(52) U.S. Cl.
CPC .......... *B29C 64/295* (2017.08); *B29C 64/255* (2017.08); *B29C 64/264* (2017.08);
(Continued)

(58) Field of Classification Search
CPC ... B29C 64/124; B29C 64/129; B29C 64/135; B29C 64/255; B29C 64/295; B33Y 10/00; B33Y 30/00; B33Y 50/02
See application file for complete search history.

(56) References Cited

U.S. PATENT DOCUMENTS 10,737,439 B2   8/2020  Ebert et al.
10,843,411 B2  11/2020  Ong et al.
(Continued)

FOREIGN PATENT DOCUMENTS

CA    2768907 A1    2/2011
EP    3434479 A1 *  1/2019    .............. B22F 12/00
(Continued)

OTHER PUBLICATIONS

International Search Report dated Jun. 8, 2022 in parent international application PCT/CA2022/050420.
(Continued)

*Primary Examiner* — Jamel M Nelson
(74) *Attorney, Agent, or Firm* — Polson Intellectual Property Law P.C.; Margaret Polson

(57) ABSTRACT

An additive manufacturing device includes a container for containing feedstock; a radiation source configured to emit radiation in an optical path incident on a bottom wall of the container; and a heater positioned in the optical path of the radiation above the bottom wall. The heater is configured to change a temperature of the feedstock proximate to a reaction interface where the radiation polymerizes at least a portion of the feedstock. The heater is also constructed to meet a transparency threshold and a flexibility threshold, which may allow the heater to be used in the optical path of the radiation and to withstand compressive and tensile forces during build cycles.

18 Claims, 25 Drawing Sheets

(51) Int. Cl.
 *B29C 64/264* (2017.01)
 *B33Y 10/00* (2015.01)
 *B33Y 30/00* (2015.01)
 *B29C 64/124* (2017.01)

(52) U.S. Cl.
 CPC .............. *B33Y 10/00* (2014.12); *B33Y 30/00* (2014.12); *B29C 64/124* (2017.08)

(56) References Cited

U.S. PATENT DOCUMENTS

| | | | | |
|---|---|---|---|---|
| 2009/0211690 | A1* | 8/2009 | Bartholomeusz | B32B 38/10 83/171 |
| 2017/0197360 | A1* | 7/2017 | Batchelder | B33Y 50/02 |
| 2017/0334129 | A1* | 11/2017 | Ebert | B29C 64/20 |
| 2018/0065302 | A1* | 3/2018 | Arai | B29C 64/245 |
| 2018/0085998 | A1 | 3/2018 | von Burg | |
| 2018/0272601 | A1* | 9/2018 | Erickson | B29C 64/176 |
| 2018/0272606 | A1 | 9/2018 | Chang et al. | |
| 2019/0240905 | A1 | 8/2019 | Von Burg et al. | |
| 2019/0315063 | A1 | 10/2019 | Von Burg et al. | |
| 2019/0358902 | A1 | 11/2019 | Slaczka et al. | |
| 2020/0361148 | A1* | 11/2020 | Mansouri | B33Y 10/00 |
| 2021/0140832 | A1 | 5/2021 | Wang et al. | |

FOREIGN PATENT DOCUMENTS

| | | | |
|---|---|---|---|
| EP | 3434479 A1 | 1/2019 | |
| WO | 2020/117490 A1 | 6/2020 | |
| WO | WO-2020117490 A1 * | 6/2020 | ........... B29C 64/124 |

OTHER PUBLICATIONS

Written Opinion of the International Searching Authority dated Jun. 8, 2022 in parent International application PCT/CA2022/050420.
Office action dated Jun. 16, 2023 in related U.S. Appl. No. 17/554,769, filed Dec. 17, 2021. Per rule 609.07, copy not provided as this is available in the USPTO system.

* cited by examiner

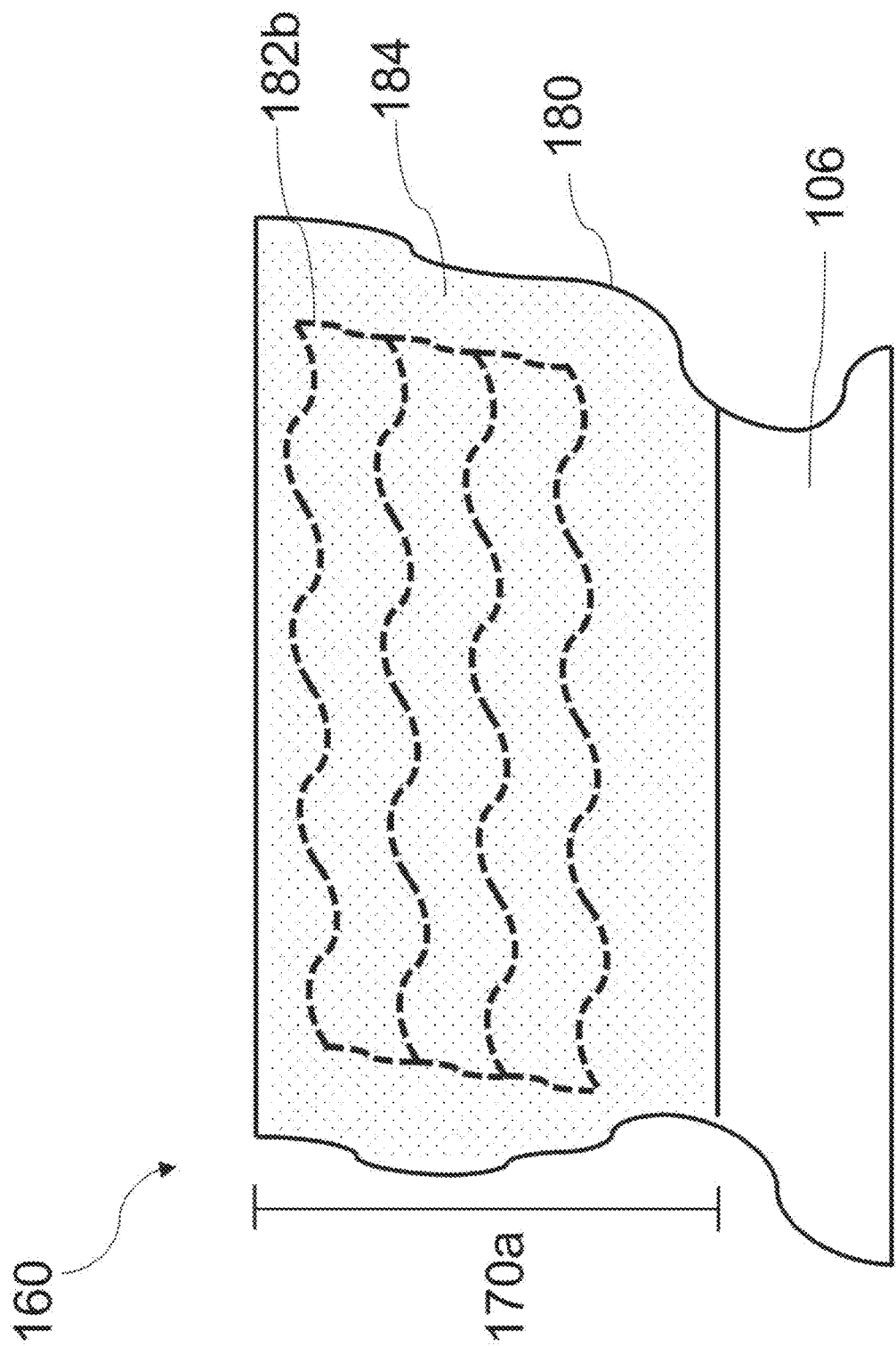

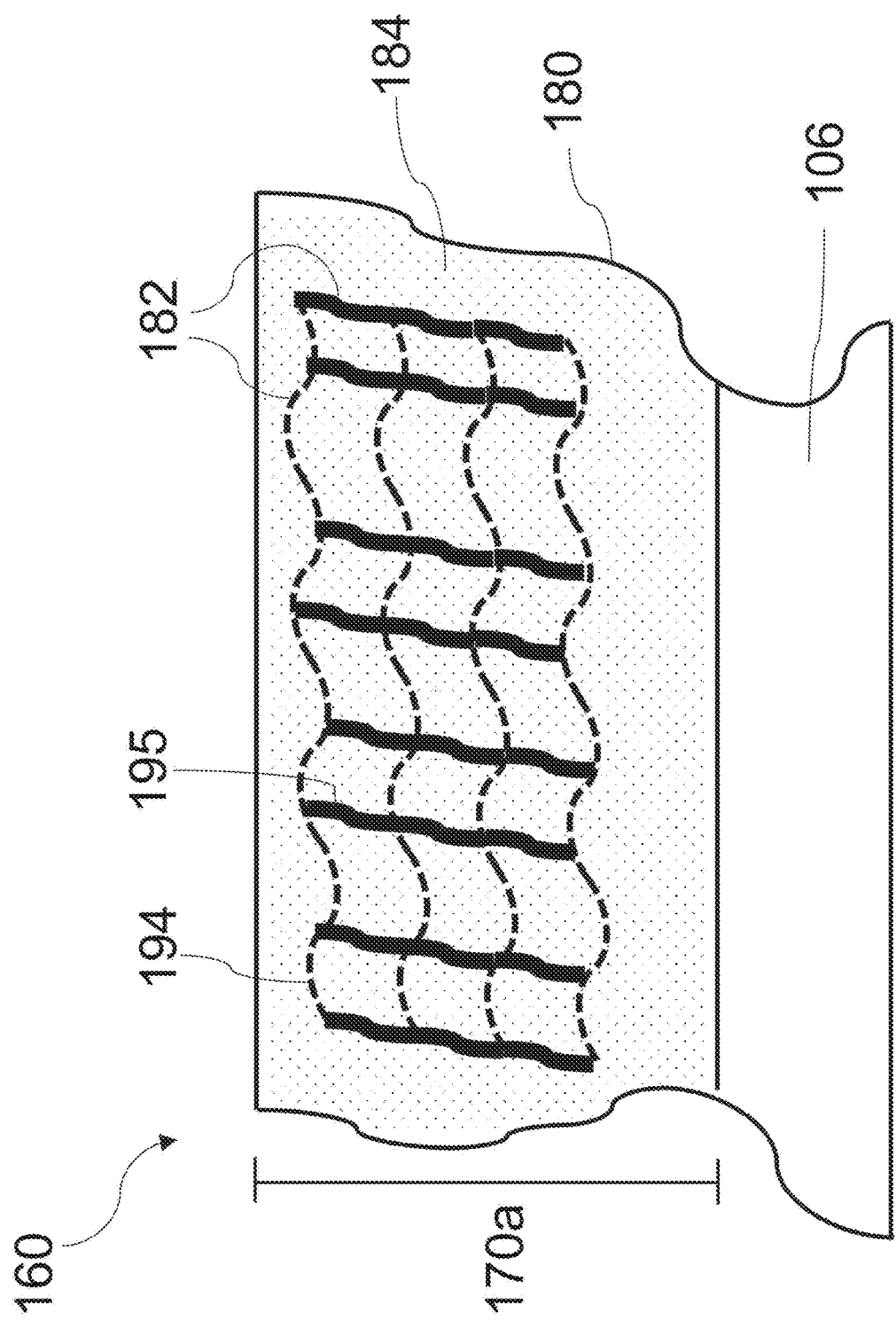

FLEXIBLE TRANSPARENT HEATER FOR ADDITIVE MANUFACTURING DEVICE

BACKGROUND

1. Field

Embodiments described herein relate generally to an additive manufacturing device and a method of operation thereof, and more particularly to an additive manufacturing device including a heater positioned above a bottom wall of the additive manufacturing device, where the heater is constructed to meet at least a transparency threshold and a flexibility threshold.

2. Description of Related Art

"Bottom-up" additive manufacturing devices typically involve (a) a container holding resin and having an optically transparent bottom wall, (b) a radiation source positioned below the bottom wall which emits radiation in an optical path upward and incident on the bottom wall to polymerize the resin in the container, and (c) a build platform supporting a structure built from the resin and which moves the structure relative to the bottom wall as the resin is polymerized to form successive layers of the structure over a plurality of build cycles. Such bottom-up additive manufacturing devices are also known as vat polymerization devices. The most common forms of vat polymerization devices are stereolithography (SLA) devices and Digital Light Processing (DLP) devices.

In such bottom-up devices, the polymerization of the resin occurs at a reaction interface defined by a build surface proximate to the bottom wall. Heating the resin can increase resin mobility and decrease resin viscosity, both of which may improve speed and uniformity of the polymerization of the resin to form the layers of the structure. It may be desirable to apply heat to the resin proximate to the reaction interface, as material forming the resin often have poor thermal conductivity and may not transfer thermal energy within the resin easily. However, the build surface in bottom-up devices is required to be optically transparent to the radiation emitted by the radiation source and is required to withstand a plurality of different compressive and tensile forces exerted thereon during a build cycle. Pre-existing heaters which may be placed proximate to the build surface may lack the optical transparency to the radiation and/or may lack the flexibility to withstand the compressive and tensile forces.

SUMMARY

In one embodiment, there is provided an additive manufacturing device comprising: a container for containing feedstock, the container having an optically transparent bottom wall; a radiation source configured to emit radiation in an optical path incident on the bottom wall; and a heater positioned in the optical path of the radiation above the bottom wall, wherein the heater is configured to change a temperature of the feedstock proximate to a reaction interface where the radiation polymerizes at least a portion of the feedstock and is constructed to meet a transparency threshold and a flexibility threshold.

In another embodiment, there is provided a method comprising: changing a temperature of feedstock within a container of an additive manufacturing device at a reaction interface with a heater positioned above a bottom wall of the container and in the optical path of radiation emitted by a radiation source, wherein the radiation polymerizes at least a portion of the feedstock at the reaction interface and the heater is constructed to meet a transparency threshold and a flexibility threshold.

Other aspects and features of the present disclosure will become apparent to those ordinarily skilled in the art upon review of the following description of specific embodiments of the disclosure in conjunction with the accompanying figures.

BRIEF DESCRIPTION OF THE DRAWINGS

In drawings which illustrate embodiments,

FIGS. 4A-4J are enlarged schematics of area A of FIG. 3, according to different embodiments;

DETAILED DESCRIPTION

Figure 1:
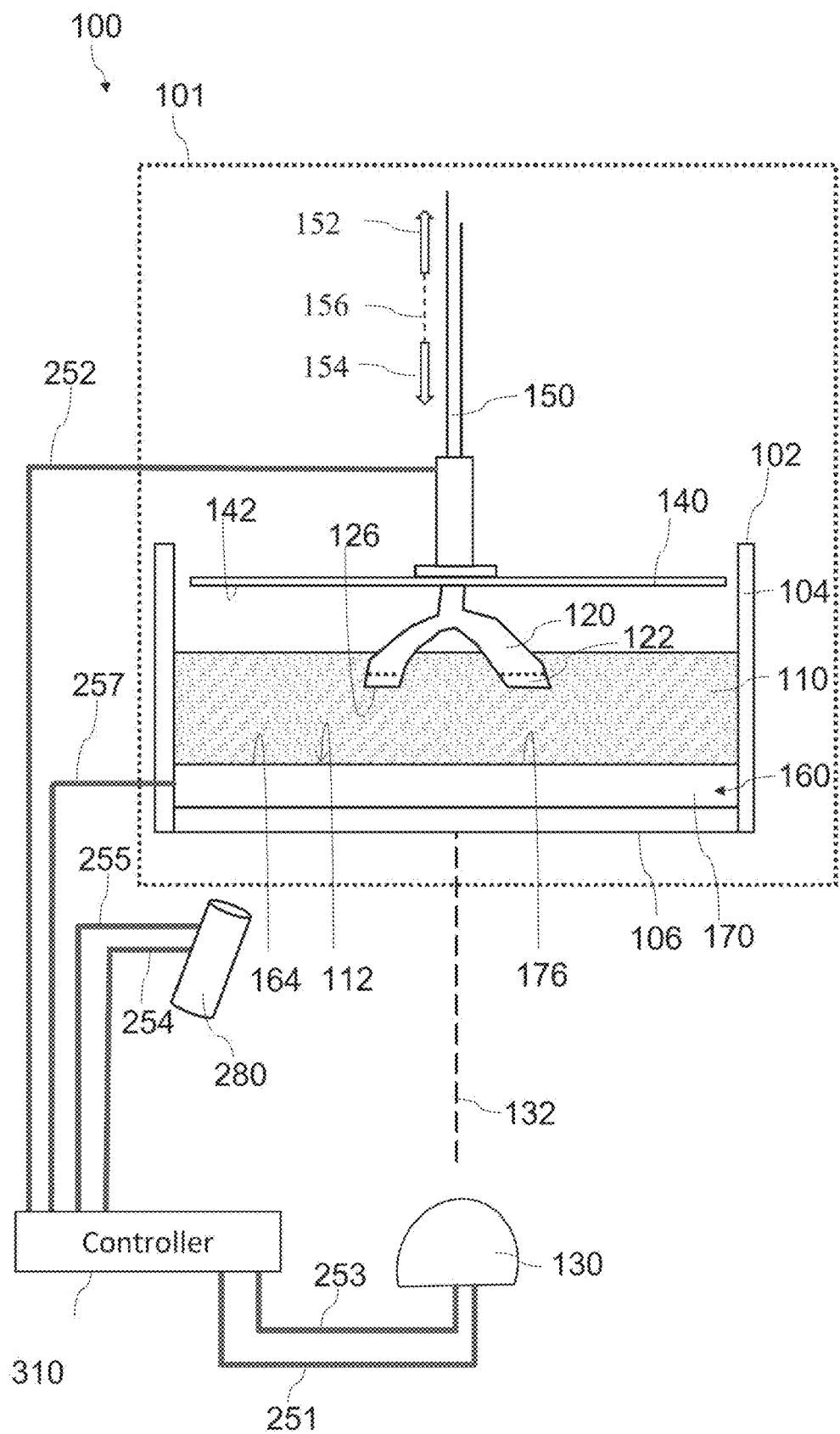
FIG. 1 is a schematic of an additive manufacturing device according to one embodiment.

Referring to FIG. 1, a schematic of an additive manufacturing device according to an embodiment is shown generally at 100. The device 100 is configured to build a structure 120 from feedstock 110 over a build process (such as build process 320 shown in FIG. 13) including a plurality of build cycles (such as build cycles 322a and 322b shown in FIG. 13), wherein a particular layer 122 of the structure 120 is built in each build cycle of the build process.

In the embodiment shown, the device 100 includes a container 102, a build platform 140, an actuator 150 coupled to the build platform 140, an interface assembly 160 including a heater 170, at least one radiation source 130 and a controller 310 in communication with at least the actuator 150, the heater 170 and the radiation source 130. The device 100 also includes an optional sensing device 280 also in communication with the controller 310. In other embodiments, the device 100 may not include the sensing device 280. In yet other embodiments, the device 100 may include fewer or additional components, such as a reservoir of the feedstock 110 and a valve which may allow or restrict flow of the feedstock 110 from the reservoir to the container 102 for example.

The container 102 is configured to retain the feedstock 110. The feedstock 110 comprises a liquid photopolymer or liquid photocurable resin, which may be polymerized into the solid structure 120 by radiation emitted by the radiation source 130. The container 102 includes a plurality of sidewalls 104 and a bottom wall 106. The bottom wall 106 defines a build area 108 (best shown in FIG. 2) for forming a layer 122 of the structure 120 from the feedstock 110 during a build cycle. During operation of the device 100, the feedstock 110 is typically provided at a volume such that the feedstock 110 covers the build area 108. The container 102 combined with the build platform 140 also define a build chamber 101 of the device 100 where the structure 120 is built during a build process.

In the embodiment shown in FIG. 1, the additive manufacturing device 100 is a "bottom-up" additive manufacturing device, such that (a) the radiation source 130 is positioned below the bottom wall 106 and is configured to emit radiation in an optical path 132 upward and incident on the bottom wall 106 and (b) the actuator 150 is positioned above the bottom wall 106 and is configured to move the build platform 140 toward and away from the bottom wall 106 in a substantially vertical travel path 156 during each build cycle as successive layers 122 of the structure 120 are formed.

In bottom-up additive manufacturing devices, the bottom wall 106 may be constructed or configured to be substantially optically transparent. The bottom wall 106 may be considered "optically transparent" when it satisfies a bottom wall transparency threshold, including a bottom wall total transmittance criteria. The total transmittance of a material is defined as its effectiveness in transmitting radiation therethrough, and is represented by a transmission coefficient of the material. The transmission coefficient is based on a ratio of total radiation transmitted through a material (e.g. transmitted flux or power) to radiation incident on the material (e.g. incident flux or power). Total transmittance may be reduced by reflectance and absorbance of the material. The bottom wall 106 may satisfy the bottom wall total transmittance criteria when it has a total transmittance of at least 50% of an emissive spectrum of the radiation emitted by the radiation source 130. In other embodiments, the bottom wall 106 may satisfy the bottom wall total transmittance criteria when it has a total transmittance of at least 60%, at least 70%, at least 80% or at least 90% of the emissive spectrum of the radiation.

The bottom wall 106 may satisfy the transparency threshold by its construction or its configuration. Non-limiting examples of materials which may be used to form the bottom wall 106 which satisfies the transparency threshold include one or more of ultraviolet ("UV") quartz, infrared radiation ("IR") quartz, acrylic, silicate, glass and transparent polymers.

The bottom wall 106 is formed of a rigid material and does not deform during a build cycle. However, in other embodiments, the bottom wall 106 may be formed of a flexible material and may be deformed by forces exerted on (or otherwise experienced by) the interface assembly 160 during a build cycle (such as by movement of the build platform 140 by the actuator 150 for example). Additive manufacturing devices including flexible bottom walls may include a tensioning system (not shown) positioned underneath the flexible bottom wall to counteract deformation thereof.

As described above, the radiation source 130 emits radiation in the optical path 132 upward and incident on the bottom wall 106. The emitted radiation polymerizes at least a portion of the feedstock 110 within the container 102 to form a layer 122 of the structure 120.

In some embodiments, the radiation source 130 may comprise at least one laser (not shown) configured to emit the radiation and at least one galvanometer (not shown) which directs the laser across the build area 108 to different coordinates to sequentially polymerize portions of the layer 122 during a build cycle. In such embodiments, the galvanometer may be responsive to frame signals 253 sent by the controller 310 to direct the laser to specific coordinates on the build area 108 to achieve a particular cross-sectional shape and configuration of the layer 122. In other embodiments, the radiation source 130 may comprise at least one lamp (not shown) configured to emit the radiation and at least one projector (not shown) associated with the lamp. The projector may direct the radiation emitted by the lamp to different portions of the build area 108 or mask certain portions of the radiation emitted by the lamp, to simultaneously polymerize multiple portions of a layer 122 during a build cycle. In such embodiments, the projector may be responsive to the frame signals 253 to direct or mask different portions of the radiation emitted by the lamp to achieve a particular cross-sectional shape and configuration of the layer 122. In some embodiments, the radiation source 130 may include both the laser and the lamp. In other embodiments, the radiation source 130 may instead include one or more of light emitting diodes, means for generating electron beams, and means for generating fluorescence illumination.

The radiation source 130 may further be configured to emit radiation at suitable emissive spectrum for polymerizing the feedstock 110. For example, the radiation source 130 may be configured to emit radiation in the UV spectrum between 10 nm and 400 nm, radiation in the visible spectrum between 400 nm and 700 nm, radiation in the IR spectrum between 700 nm and 1 mm, or any combination thereof. The radiation source 130 may be responsive to a wavelength component of emission signals 251 sent by the controller 310 to emit the radiation at a particular emissive spectrum, and the wavelength component may be based at least in part on a type of material of the feedstock 110.

The radiation source 130 may also emit the radiation at a plurality of energy or intensities, and may be configured to emit the radiation as a radiant energy between 0.1 W and 500 W for example. The radiation source 130 may be responsive to an intensity component of the emission signals 251 sent by the controller 310 to emit the radiation at a particular intensity. The intensity component may be based at least in part on a material of the feedstock 110.

Figure 13:
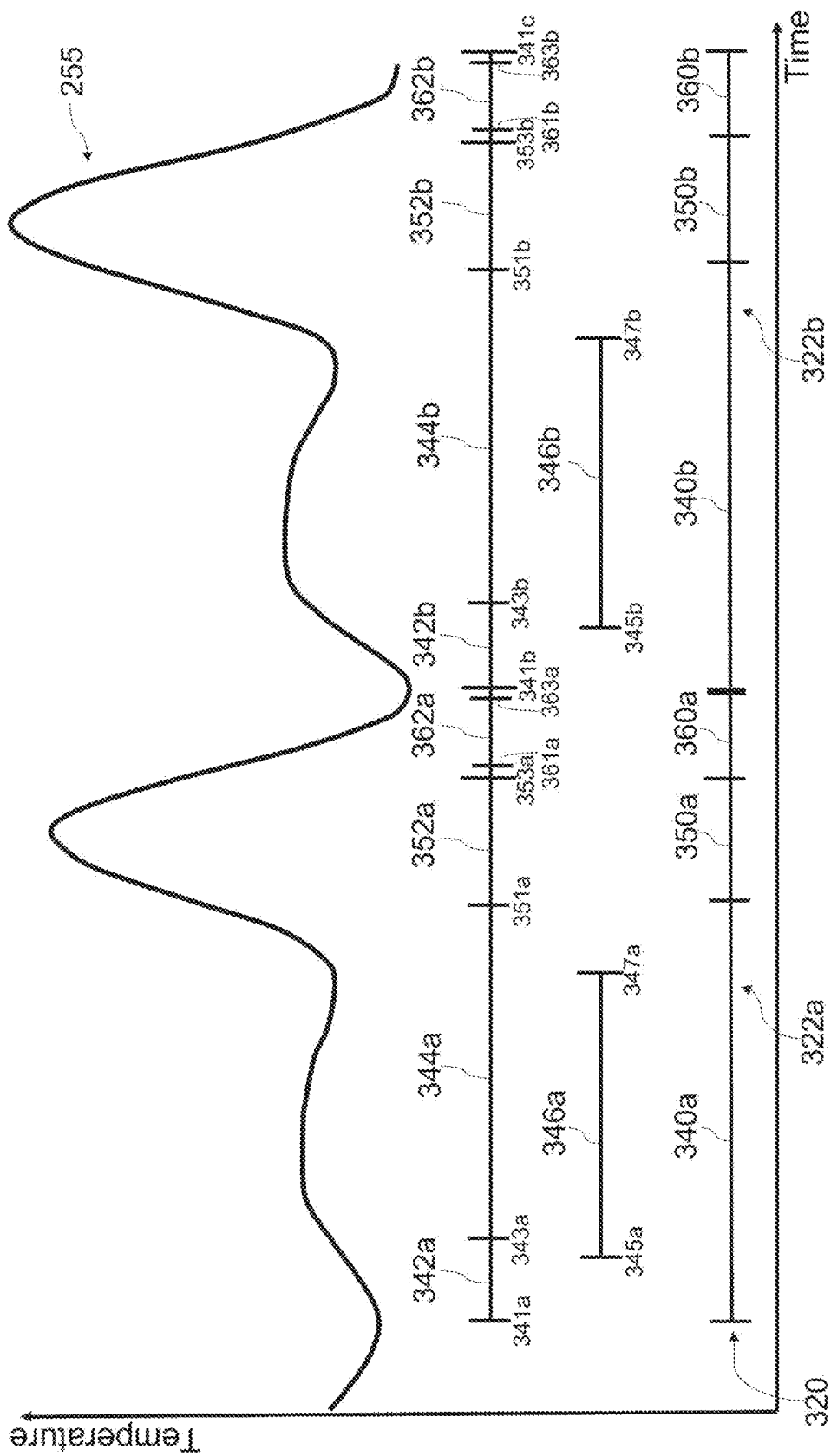
FIG. 13 is a graph of a change in temperature over time over a plurality of build cycles of a build process during operation of the additive manufacturing device of FIG. 1 according to one embodiment.

Additionally, the radiation source 130 may be configured to emit the radiation at a particular time (an "exposure start time", such as exposure start times 351*a* and 351*b* shown in FIG. 13) during a build cycle and for a particular duration (an "exposure interval", such as exposure intervals 352*a* and 352*b* shown in FIG. 13). The radiation source 130 may be responsive to start time and interval components of the emission signals 251 sent by the controller 310 to emit the radiation at a particular start time in a build cycle and for a particular duration respectively.

The build platform 140 is configured to support the structure 120 during the build process and includes a bottom surface 142 upon which the structure 120 is adhered to. The actuator 150 is coupled to the build platform 140 and is configured to move the build platform 140 along the travel path 156 in an upward direction 152 away from the bottom wall 106 and in a downward direction 154 toward the bottom wall 106 during each build cycle. The actuator 150 may comprise a micro-linear actuator configured to vertically move the build platform 140 in increments of 0.1 μm. The actuator 150 may be responsive to a direction component of actuator signals 252 sent by the controller 310 to move the build platform 140 in either the upward or downward directions 152 or 154, and the direction component may be based at least in part on a stage (such as pre-exposure stages 340a and 340b versus post-exposure stages 360a and 360b shown in FIG. 13 for example) of a build cycle.

The actuator 150 may also be configured to move the build platform 140 at particular times (a "movement start time", such as pre-exposure movement start times 341a, 341b and 341c and post-exposure movement start times 361a and 361b shown in FIG. 13) during a build cycle. The actuator 150 may be responsive to a start time component of the actuator signals 252 sent by the controller 310 to move the build platform 140 at a particular start time in a build cycle.

The actuator 150 may also be configured to move the build platform along the travel path 156 different distances in either the upward or downward directions 152 or 154. For example, the actuator 150 may be configured to move the build platform 140 in the upward direction 152 between approximately 10 μm and approximately 10,000 μm, and in the downward direction 154 between approximately 0 μm and approximately 10,000 μm, during a build cycle. The actuator 150 may also be configured to move the build platform 140 such that a bottom layer surface 126 of the portion of the structure 120 adhered to the build platform 140 (or the bottom surface 142 of the build platform 140 during a first build cycle of the build process) is a layer distance 144 (shown in FIG. 14A) away from a build surface 164 of the interface assembly 160. The actuator 150 may be responsive to travel distance and position components of the actuator signals 252 sent by the controller 310 to move the build platform 140 for a particular travel distance or such that the bottom layer surface 126 (or the bottom surface 142) is the layer distance 144 away from the build surface 164.

The interface assembly 160 is configured to be positioned within the container 102 above the bottom wall 106 and underneath the feedstock 110 when the feedstock 110 is within the container 102, such that the interface assembly 160 is in the optical path 132 of the radiation emitted by the radiation source 130 between the feedstock 110 to be polymerized and the radiation source 130.

The interface assembly 160 includes at least one layer, where a top surface of a top layer of the at least one layer forms the build surface 164 where polymerization of the feedstock 110 occurs in a build cycle. The feedstock 110 forms the reaction interface 112 where the feedstock 110 contacts the build surface 164.

The interface assembly 160 includes the heater 170 configured to heat the feedstock 110 to a desired target temperature or to above a threshold temperature. Heating the feedstock 110 to the target temperature (or above the threshold temperature) may decrease the viscosity of the feedstock 110 to a target viscosity (or to exceed a threshold viscosity). Feedstock 110 at the target temperature (or above the threshold temperature) and/or at the target viscosity (or above the threshold viscosity) may polymerize to a greater extent, polymerize at a higher degree and react more readily to the radiation emitted by the radiation source 130, due at least in part to increase mobility of molecules of the material of the feedstock 110. The increase in mobility of the feedstock 110 can promote increased penetration of the radiation into the feedstock 110 and decrease the dose of critical energy of the radiation required to polymerize the feedstock 110. This can reduce the required exposure intensity and/or the required exposure interval for the radiation to sufficiently polymerize a particular layer 122 of the structure 120, which can in turn reduce the cycle time for a particular build cycle and the overall build time for a particular build process. Layers 122 may be considered "sufficiently" polymerized when the layer 122 maintains the shape and configuration of the received frame (such as the frame in the frame signals 253 shown in FIG. 1) and can withstand forces exerted on the structure 120 over a build process. The feedstock 110 at the target viscosity (or above the threshold viscosity) may also reduce adhesion between a newly polymerized layer 122 and the build surface 164.

Figure 2:
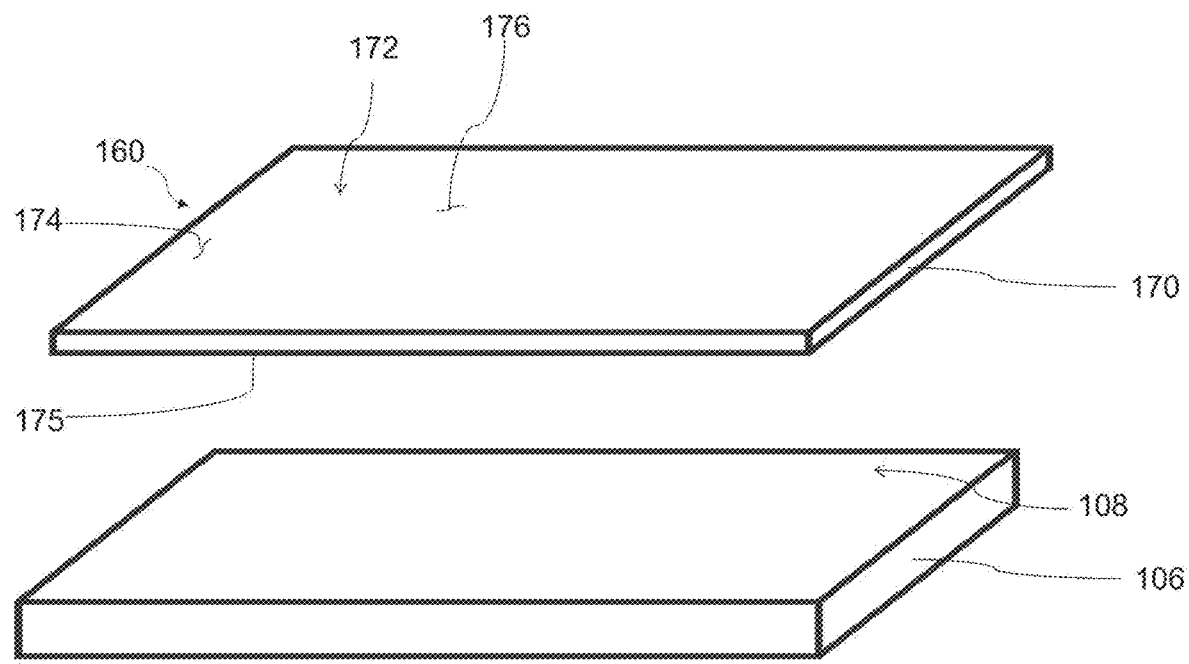
FIG. 2 is a perspective view of an interface assembly of the additive manufacturing device of FIG. 1 according to one embodiment; embodiment.
Figure 3:
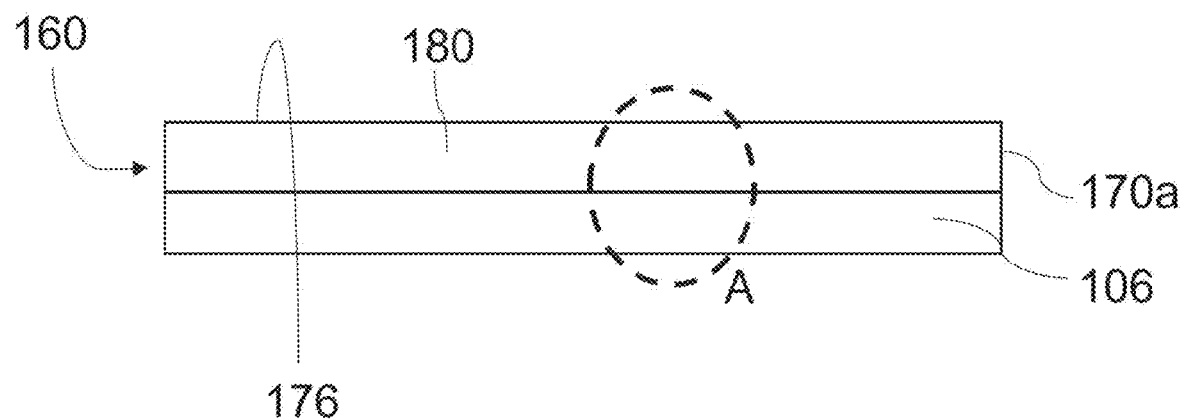

Referring to FIG. 2, the heater 170 comprises a contact heater having a top surface 174 and a bottom surface 175 and having a length and a width defining a heater area 172. The heater area 172 is sized to cover the entire build area 108 defined by the bottom wall 106. However, in other embodiments, the heater area 172 may be sized differently from the build area 108. In the embodiment shown in FIG. 2, the heater 170 is the only layer of the interface assembly 160. As such, the bottom surface 175 directly contacts the bottom wall 106 and the top surface 174 is configured to directly contact the feedstock 110 when the feedstock 110 is within the container 102. The top surface 174 thus forms the build surface 164 of the interface assembly 160. In the embodiment shown, the heater 170 is configured to directly change a temperature of material that is in contact with the top surface 174, and thus the top surface 174 also forms the heating interface 176. As the top surface 174 is configured to directly contact the feedstock 110 at the reaction interface 112 in the embodiment shown in FIG. 2, heating interface 176 directly heats the feedstock 110 at the reaction interface 112. In embodiments where the interface assembly 160 includes additional layers (such as one or more of at least one separating layer 260 and at least one structural layer 270 shown in FIGS. 9-12), the heater 170 may be separated from the bottom wall 106 by one or more layers and/or may be separated from the feedstock 110 by one or more layers. In such embodiments, the top surface 174 may contact other layers of the interface assembly 160 and the heating interface 176 may heat these other layers in addition to the feedstock 110 at the reaction interface 112. For example, the heater 170 may initially heat these other layers and the increase in temperature of these other layers may be transferred to the reaction interface 112 due to at least in part to a thinness, construction or configuration of these other layers.

Referring back to FIG. 1, in some embodiments, the heater 170 may be configured to generate heat at a particular start time (a "heating start time", such as heating start times 345a and 345b shown in FIG. 13) during a build cycle and for a particular duration (a "heating interval", such as heating intervals 346a and 346b shown in FIG. 13). The heater 170 may be responsive to start time and interval components of the heater signals 257 sent by the controller 310 to generate heat at a particular start time in a build cycle and for a particular duration.

The materials used to construct or configure the heater 170 may be required to satisfy different criteria and thresholds before the heater 170 can be suitable for use in the device 100. For example, the heater 170 may be constructed or configured to heat feedstock 110 within the reaction interface 112 to a particular temperature or a particular range of temperatures within a set amount of time, and may thus be required to satisfy a temperature change threshold. The temperature change threshold may be defined by a power criteria and a uniformity criteria. In other embodiments, the temperature change threshold may include additional or fewer criteria.

In embodiments where the heater 170 is constructed as a resistance-based heater, the heater 170 may include conductive materials of different types and different nanostructures and which have been applied using different application methods, in different patterns, at different concentrations, at different thicknesses and at different surface roughnesses (described below in association with FIGS. 4A-4J). These different variables in the conductive material may provide the heater 170 with a specific power density. Power density is generally defined as an amount of heat energy generated by a heater from each square linear dimension of the heater. The power density of a particular heater 170 may determine the speed at which the heater 170 can heat the feedstock 110 at the reaction interface 112 to a particular temperature (such as the target temperature for example) in response to a particular input voltage or an input current by an external power source (not shown). The power density may also determine a maximum temperature that the heater 170 can heat the feedstock 110 at the reaction interface 112 to in response to a particular input voltage or input current by the external power source. For example, where the power density of a particular heater is large, the heater may generate a large amount of heat energy to heat the feedstock 110 to a particular temperature faster, and may also heat the feedstock 110 to a relatively high maximum temperature in response to a particular input voltage or input current; however, the large amount of heat energy may damage the heater itself, other layers of the interface assembly 160 or other components of the device 100. If the power density of a particular heater is small, the heater may generate less heat energy, may take a longer amount of time to heat the feedstock 110 to a particular temperature and may heat the feedstock 110 to a lower maximum temperature. The heater 170 may satisfy the power criteria when it has a power density of at least 100 W/m$^2$. In other embodiments, the heater 170 may satisfy the power criteria when it has a power density of between 100 W/m$^2$ and 20,000 W/m$^2$. When the heater 170 is constructed as a sheet, different variations in the type and application of the conductive material may provide the heater 170 with a sheet resistance also representative of heat energy generated by the heater 170. The heater 170 may satisfy the power criteria when it has a sheet resistance between approximately 1Ω/□ and approximately 300Ω/□. In other embodiments, the heater 170 may satisfy the power criteria when it has a sheet resistance between approximately 1Ω/□ and 1000 Ω/□.

The heater 170 may also be required to heat the entire build area 108 or a specific region 109 (shown in FIGS. 6-8) of the build area 108 uniformly. Many types of material used as the feedstock 110 may have poor thermal conductivity and inhibit heat transfer to create localized pockets of high or low temperatures as portions of the feedstock 110 are polymerized with the radiation. Maintaining uniform heating across the build area 108 can minimize temperature peaks or temperature gradients across the reaction interface 112 during build cycles, and can also minimize local overheating of the feedstock 110. The heater 170 may satisfy the uniformity criteria when it is capable of heating the feedstock 110 at the reaction interface 112 across each square linear dimension of the heating interface 176 to a particular target temperature across within a reasonable deviation. For example, the heater 170 may satisfy the uniformity criteria if it is capable of heating the feedstock 110 across each square linear dimension of the heating interface 176 to within a ±10% variation of the target temperature (such as ±10% variation of the target temperature of 35° C. for example). In other embodiments, the heater 170 may satisfy the uniformity criteria if it maintains ±5%, ±15% or ±25% variation in the target temperature.

As the heater 170 is positioned within the optical path 132 of the radiation source 130, the heater 170 is also constructed or configured to be substantially optically transparent. The heater 170 may be considered "optically transparent" when it satisfies a transparency threshold. The transparency threshold may be defined by one or more of a total transmittance criteria, a transmission haze criteria, and a transmission clarity criteria. In other embodiments, the transparency threshold may include additional or fewer criteria.

The total transmittance of a material was described above in association with the bottom wall 106, and is generally defined as the material's effectiveness in transmitting radiation therethrough. The heater 170 may satisfy the total transmittance criteria when it has a total transmittance of at least 50% of the emissive spectrum of the radiation emitted by the radiation source 130. In other embodiments, the heater 170 may satisfy the total transmittance criteria when it has a total transmittance of at least 60%, at least 70%, at least 80%, or at least 90% of the emissive spectrum of the radiation.

The total transmittance of a material can be a combination of: (1) direct transmittance, where the incident radiation passes through the material at a predictable specular angle and (2) diffuse transmittance, where the incident radiation is scattered by the material at numerous, random and unpredictable angles. Material which has a high total transmittance but also high diffuse transmittance may not be suitable for use as the heater 170, as it may result in loss of fidelity of the polymerized layer 122 to the frame representing a desired shape and configuration of the layer 122 to be formed (such as the frame in the frame signals 253 shown in FIG. 1). For example, diffuse transmittance where the incident radiation is scattered by the material at narrow-angles may cause a loss of clarity, reducing sharpness of the frame transmitted to the feedstock 110 through the material. Narrow-angle scattering may be caused by large irregularities of the material. Additionally, diffuse transmittance where the incident radiation is scattered by the material at wide-angles may cause transmission haze, resulting in a loss of transmissive contrast and distorting the frame transmitted to the feedstock 110 through the material. Wide-angle scatter may be caused by small irregularities of the material. Irregularities of a material include without limitation impurities, surface structure, internal optical irregularities (e.g. poorly dispersed particles, non-uniform particle size, inhomogeneous crystallization, differences in density), microscopic structures and porosity. Reducing irregularities of the material used to construct the heater 170 may limit wide-angle and narrow-angle diffuse scattering.

Wide-angle scattering of incident radiation by a material may be defined as a percentage of radiation transmitted through the material that deviates from a principal direction of the incident radiation by a wide-angle of more than about 2.5° degrees. The heater 170 may satisfy the transmittance haze criteria when it scatters less than 30% of the radiation incident on the bottom surface 175 at the wide-angle. In other embodiments, the heater 170 may satisfy the transmission haze criteria when it scatters less than 25%, less than 20% or less than 15% of the incident radiation at the wide-angle. Narrow-angle scattering of incident radiation by a material may be defined as the percentage of radiation transmitted through the material that deviates from a principal direction of the incident radiation at a narrow-angle in a range of more than about 0° and less than or equal to about 2.5°. The heater 170 may satisfy the transmittance clarity criteria when it scatters less than 50% of the radiation incident on the bottom surface 175 at the narrow-angle. In other embodiments, the heater 170 may satisfy the transmission clarity criteria when it scatters less than 45%, less than 40%, less than 35% or less than 30% of the incident radiation at the narrow-angle. In some embodiments, the heater 170 may satisfy the transparency threshold when it exhibits a total transmittance of 50% or greater, wide-angle scattering of 30% or less and narrow-angle scattering of 50% or less. The total transmittance, the wide-angle scattering and the narrow-angle scattering of the incident radiation may be measured using existing instruments, such as the BYK Haze-Gard Plus meter sold by BYK-Gardner GmbH (d.b.a. BYK Instruments) for example.

The transparency threshold including the total transmittance criteria, the transmission haze criteria and the transmission clarity criteria may be applied to the heater 170 alone, such that only transmittance through the heater 170 (from the bottom surface 175 to the top surface 174) is assessed to determine whether the transparency threshold is satisfied. The transparency threshold may also be applied to the entire interface assembly 160, such that the combination of layers of the interface assembly 160 (such as the combination of one or more of the heater 170, the at least one separating layer 260 and the at least one structural layer 270 shown in FIGS. 9-12) are required to collectively satisfy the transparency threshold. In such embodiments, transmittance through the entire interface assembly 160 may be assessed. In yet other embodiments, the transparency threshold may be applied to a combination of the entire interface assembly 160 and the bottom wall 106.

As described below in association with FIG. 13, build cycles of the build process 320 may exert at least one force on the interface assembly 160 (including the heater 170). The force may be caused by the movement of the build platform 140 (and the portion of the structure 120 adhered to the build platform 140) by the actuator 150. The force may be dynamic or static, and may be of different magnitudes depending on a stage of the build cycle. For example, the force may be dynamic when the actuator 150 is moving the build platform 140 (such as during pre-exposure movement intervals 342a and 342b and post-exposure movement intervals 362a and 362b shown in FIG. 13), but static when the actuator 150 is not moving the build platform 140 but still exerting a force on the interface assembly 160 (such as at pre-exposure movement stop times 343a and 343b shown in FIG. 13). The force may also be a compressive force exerted in the downward direction 154 during the pre-exposure stage (such as pre-exposure stages 340a and 340b shown in FIG. 13) and/or a tensile force exerted in the upward direction 152 during the post-exposure stage (such as post-exposure stages 360a and 360b shown in FIG. 13) as a newly polymerized layer 122 adheres to the build surface 164 (best shown in FIG. 14C) before being separated therefrom. Further, the force may be exerted at a single location or at multiple locations across the build surface 164 during a particular build cycle, depending on a shape and configuration of the layer 122 to be formed during that build cycle. The force may also be exerted at different locations across the build surface 164 during a build process, depending again on the shape and configuration of the different layers 122 formed during different build cycles of the build process. The force may also be caused by the polymerization of the feedstock 110 during a build cycle. For example, polymerization of the liquid feedstock 110 into the solid layer 122 can result in a local pressure drop in a volume confined by the newly polymerized solid layer 122 and the build surface 164, which can cause a transient vacuum effect that exerts a force on the interface assembly 160. Additionally, the interface assembly 160 may also experience internal strain and stress forces caused at least in part by a flexibility and elasticity of the interface assembly 160 itself and a tendency of the interface assembly 160 to return to its original shape/configuration after a force exerted thereon is no longer present.

The forces exerted on (or otherwise experienced by) the interface assembly 160 may also be repeated over the plurality of build cycles of the build process, and over multiple build processes. As such, the heater 170 may also be constructed or configured to withstand repeated forces, and may be required to satisfy a flexibility threshold. The flexibility threshold may be defined by one or more of a modulus criteria and a radius of curvature criteria. In other embodiments, the flexibility threshold may include fewer or additional criteria.

A material may be tested in a flexure test to determine flexural (bending) properties from a stress-strain curve for the material. The flexure test may be conducted according to a three-point bend test as outlined in ISO 178 or in ASTM D790 for example. A modulus (i.e. modulus of elasticity or flexural modulus) of a material is defined as the ability of the material to bend prior to a yield point, and can be determined by determining a slope of an initial linear portion of the stress-strain curve of the material. The heater 170 may satisfy the modulus criteria when it has a flexural modulus of less than 5 gigapascals (GPa). In other embodiments, the heater 170 may satisfy the modulus criteria if it has a flexural modulus of less than 6 GPa, less than 4 GPa or less than 3 GPa.

The radius of curvature of a material is defined as a ratio of the modulus of elasticity of the material relative to a bending moment experienced by the material. The heater 170 may satisfy the radius of curvature criteria if it has a threshold radius of curvature equal to or less than 7 mm. In other embodiments, the heater 170 may satisfy the radius of curvature criteria if it has a threshold radius of curvature equal to or less than 6 mm, equal to or less than 5 mm or equal to or less than 8 mm.

The flexibility threshold including the modulus criteria and the radius of curvature criteria may be applied to the heater 170 alone, such that only the flexibility of the heater 170 is assessed to determine whether the flexibility threshold is satisfied. In other embodiments, the flexibility threshold may be applied to the entire interface assembly 160, such that the combination of layers within the interface assembly 160 (such as the combination of one or more of the heater 170, the at least one separating layer 260, and the at least one structural layer 270 shown in FIGS. 9-12) are required to collectively satisfy the flexibility threshold.

As described above, build cycles may expose the interface assembly 160 (including the heater 170) a variety of compressive and tensile forces. The forces exerted on (or otherwise experienced by) the interface assembly 160 may also be repeated over the plurality of build cycles of the build process, and again over multiple build processes. Build cycles may also expose the interface assembly 160 to a variety of temperatures and a variety of humidities. Changes in temperature and humidity may be caused by polymerization of the feedstock 110 by the radiation at the reaction interface 112 releasing heat and generating air vapour. For example, during a build process, the interface assembly 160 may experience temperatures between 0° C. and 150° C. and relative humidities between 0% and 100%. The heater 170 may also be constructed or configured to withstand repeated forces, exposure to repeated changes in temperature and exposure to repeated changes in humidity without significant degradation of its material property characteristics, and may be required to satisfy a durability threshold. The durability threshold may be defined by one or more of a flex durability criteria and the environmental durability criteria. In other embodiments, the durability threshold may include fewer or additional criteria.

As described above, the material properties of the heater 170 include the temperature change properties (satisfies the temperature change threshold including the power criteria and the uniformity criteria), the optical transmittance properties (satisfies the transparency threshold including the total transmittance criteria, the transmission haze criteria and the transmission clarity criteria) and the flexibility properties (satisfies the flexibility threshold including the modulus criteria and the radius of curvature criteria). The heater 170 may satisfy the flex durability criteria if it maintains such material properties within a reasonable deviation after repeated forces are exerted thereon during a plurality of build cycles and over multiple build processes. For example, the heater 170 may satisfy the flex durability criteria if it maintains ±20% variation for at least one material property (such as ±20% of an initial sheet resistance (power criteria), ±20% variation of ±10% variation of a set target temperature across each square linear dimension of the heating interface 176 (uniformity criteria), ±20% of at least 50% total transmittance (total transmittance criteria), ±20% of less than 30% wide-angle scatter (transmission haze criteria) or ±20% of less than 50% narrow-angle scatter (transmission clarity criteria), ±20% of an initial flexural modulus (modulus criteria) and ±20% of an initial radius of curvature (radius of curvature criteria)) after at least 10,000 build cycles. In other embodiments, the heater 170 may satisfy the durability criteria if it maintains ±30% variation, ±10% variation, or ±5% variation for at least one material property after at least 10,000 build cycles. In yet other embodiments, the exposure period may be greater than or less than 10,000 build cycles, and may range between 1000 build cycles and 20,000 build cycles for example.

The heater 170 may satisfy the environmental durability criteria if it maintains the material properties within a reasonable deviation after repeated increases and decreases in temperature and repeated increases and decreases in relative humidity. For example, the heater 170 may satisfy the environmental durability criteria if it maintains ±20% variation for at least one material property after at least 1000 hrs of exposure to a temperature greater than 65° C. and a relative humidity of greater than 50%. In other embodiments, the heater 170 may satisfy the environmental durability criteria if it maintains ±30% variation, ±10% variation, or ±5% variation for at least one material property after at least 1000 hrs of exposure to a temperature greater than 65° C. and a relative humidity of greater than 50%. In yet other embodiments, the exposure period may be greater than or less than 1000 hours, and may range from between 200 hours and 2000 hours for example. In yet other embodiments, the exposure temperature may be greater than or lower than 65° C., and may range between 0° C. and 150° C. for example. In yet other embodiments, the exposure humidity may be different than 50%, and may range between 0% and 100% for example.

The durability threshold, including the flex durability criteria and the environmental durability criteria, may be applied to the heater 170 alone, such that only the durability of the heater 170 is assessed to determine whether the durability threshold is satisfied. In other embodiments, the durability threshold may be applied to the entire interface assembly 160, such that the combination of layers within the interface assembly 160 (such as the combination of one or more of the heater 170, the at least one separating layer 260, and the at least one structural layer 270 shown in FIGS. 9-12) are required to collectively satisfy the durability threshold.

Existing optically transparent and electrically conductive materials may not satisfy the one or more of the thresholds described above (such as the temperature change threshold, the transparency threshold, the flexibility threshold and the durability threshold) required for use in the device 100 and required for use as a layer of the interface assembly 160. For example, film heaters constructed from indium tin oxide ("ITO") and other metal oxides may have crystalline structures which are brittle and lack flexibility. Such ITO film heaters may crack when bent under a compressive force at a radius of curvature smaller than 7 mm or when bent under a tensile force at a radius of curvature smaller than 11 mm, and such ITO film heaters may not satisfy the radius of curvature criteria required for use in the device 100. Additionally, after any such cracking, material properties (such as the temperature change properties and the optical transmittance properties for example) of the ITO film heater may become irreversibly changed from an initial value. For example, cracking of an ITO film heater may permanently increase its sheet resistance, permanently change its power density, permanently change its total transmittance and permanently increase the percentage of radiation scattered by the film at both the narrow-angle and the wide-angle, and such ITO film heaters may not satisfy the durability threshold required for use in the device 100.

The heater 170 may satisfy the temperature change threshold, the transparency threshold, the flexibility threshold, and the durability threshold by its construction or its configuration. In the embodiment shown in FIGS. 3 and 4A-4J, the heater 170 is a resistance-based heater 170a comprising a conductive film 180. The conductive film 180 includes conductive material 182 and a carrier 184. The top surface of the conductive film 180 forms the heating interface 176. The conductive film 180 may also include electrodes or other means for electrical connection (not shown) configured to provide current from the external power source to the conductive film 180 and the conductive material 182.

Non-limiting examples of the conductive material 182 include one or more of poly(3,4-ethylenedioxythiophene) polystyrene sulfonate (PEDOT:PSS), carbon, graphene, metal (silver, gold or copper for example) and metal alloy (cupronickel or silver alloy for example). Different types of material may have different conductivity (carbon may have a lower conductivity than a similar amount of metal or metal alloy for example), and the type of conductive material 182 may be selected to provide the conductive film 180 with a selected conductivity, resistance or power density to allow the resulting heater 170a to satisfy the temperature change threshold required for use in the device 100. Additionally, the conductive material 182 may comprise more than one type of conductive material, and may include the conductive material 182 made of a first type of material and the conductive material 182 made of a second type of material. In other embodiments, the conductive material 182 may comprise fewer or more types of material. Combining different types of material may allow more granular selection of conductivity, resistance or power density of the conductive film 180 to allow the resulting heater 170a to satisfy the temperature change threshold.

The conductive material 182 may be dimensioned to be smaller than a pixel size of the radiation projected by the projector or smaller than a diameter of a beam of radiation emitted by the laser onto the build area 108. Using conductive material 182 dimensioned to be smaller than a pixel size or a diameter of the beam can provide the conductive film 180 with optical transmittance to allow the resulting heater 170a to satisfy the transparency threshold required for use in the device 100. For example, the conductive material 182 may be dimensioned as microstructures or nanostructures, including without limitation, as:

a. 0 dimensional ("0D") nanostructures, such as nanoparticles and nanocubes;
b. one-dimensional ("1D") nanostructures, such as nanowires, nanotubes, nanofibers; and
c. two-dimensional ("2D") nanostructures, such as nanosheets, nanoflakes, nanoplates.

The type of nanostructure of the conductive material 182 may be selected to provide the conductive film 180 a conductivity, resistance and power density to allow the resulting heater 170a to satisfy the temperature change threshold, as a same conductive material having different nanostructures may have different conductivity even when present at a same concentration or applied in a same manner. In this respect, conductive films having a particular concentration of a particular type of conductive material having a first nanostructure may have different conductivities and different resistances when compared to a conductive film having the same concentration of the same type of conductive material having a second nanostructure. Generally, a 2D nanosheet may have higher conductivity than 1D nanotubes at a same concentration, and 1D nanotubes may in turn have higher conductivity than 0D nanoparticles at the same concentration. The type of nanostructure may also affect a percolation threshold of the conductive material 182, which in turn affects the concentration of the conductive material 182 required to meet the uniformity criteria or the temperature change criteria (described in greater detail below). For example, a lower concentration of 2D nanosheets may be required to meet a percolation threshold for the heating area 172 having a particular dimension when compared 1D nanotubes or 0D nanoparticles, as the larger nanosheets may form a conductive network across the heating area 172 at lower concentrations when compared to smaller nanotubes and nanotubes may form the conductive network at lower concentrations when compared to even smaller nanoparticles.

The conductive material 182 may also comprise more than one type of nanostructure, and may include a conductive material having a first nanostructure and the conductive material having a second nanostructure. In other embodiments, the conductive material 182 may comprise more types of nanostructures. Combining conductive materials 182 having different types of nanostructures, and in particular combining nanostructures having different dimensions (i.e., 0D nanostructures combined with either 1D or 2D nanostructures, or 1D nanostructures combined with either 0D or 2D nanostructures), may allow more granular adjustment of the conductivity, resistance and power density of the conductive film 180 to allow the resulting heater 170a to satisfy the temperature change threshold, and also allow more granular adjustment of a concentration of the conductive material 182 required to meet the percolation threshold for the heating area 172, which in turn affects the concentration of the conductive material 182 required to satisfy the uniformity criteria or the temperature change criteria.

Additionally, the conductive material 182 may be deposited on or within the carrier 184 using different methods, such as via sputtering, ion plating, ultrasonic atomization spraying, screen printing, hot rolling, electrospinning and vapor deposition. The method of application of the conductive material 182 may be chosen to achieve a particular surface roughness. The deposited conductive material 182 may also be processed after deposit to achieve a particular surface roughness. Surface roughness of the conductive material 182 may affect the intensity or the amount of heat energy and the uniformity of heat energy generated by the heater 170a, as high surface roughness results in a higher surface area which may in turn result in more efficient transfer of heat energy to the feedstock 110 at the reaction interface 112. Surface roughness may also affect the durability of the conductive film 180, as more efficient transfer of heat may extend the lifetime of the conductive film 180 and maintain the structural integrity of the conductive material 182. The application method and post application processing of the conductive material 182 may be selected and controlled such that the conductive material 182 (or generally the top surface 174 of the heater 170a) has an average surface roughness Ra across the heating interface 176 of between Ra<10 nm and <100 nm.

Additionally, the conductive material 182 may be deposited on or present in the carrier 184 in a specific amount to achieve a particular concentration. The deposited conductive material 182 may also be processed after deposit to achieve a particular concentration. The concentration of the conductive material 182 may affect the intensity or the amount of heat energy and the uniformity of heat energy generated by the heater 170a, as the conductive material 182 at a greater concentrations may have greater conductivity and generate greater and more uniform heat when compared to the same conductive material 182 at a smaller concentrations. In certain embodiments, the conductive material 182 may be deposited on or within the carrier 184 at a sufficient concentration to form one or more thermally conductive pathways through the carrier 184, and may specifically be deposited a sufficient concentration to form a plurality of thermally conductive pathways that exceeds a percolation threshold of the conductive material 182 for a heating area 172 having a particular dimension, such that the input current generated by the external power source (not shown) is able to travel using the plurality of thermally conductive pathways across the heater area 172 forming the heating interface 176 and the conductive material 182 generally forms a conductive network. Where the conductive material 182 is deposited at a concentration less than the percolation threshold, there may not be a continuous conductive pathway across the heater area 172 as different pieces of the conductive material 182 may be too far apart for electronic charges of the input current to flow therebetween. The percolation threshold depends on at least the conductivity and resistance of the conductive material 182 (which is itself dependent on a type, dimensions and nanostructure of the conductive material 182), dimensions of the conductive material 182, and dimensions of the heater area 172. As such, the percolation threshold for a particular type of conductive material or conductive material having a particular nanostructure may be different from the percolation threshold for another type of conductive material or conductive material having another type of nanostructure. In certain embodiments, the conductive material 182 may reach or exceed the percolation threshold when conductive material 182 has a weight density of between approximately 0.1 mg/m$^2$ and approximately 5000 mg/m$^2$ across the heater area 172. In other embodiments, the conductive material 182 may reach or exceed the percolation threshold when the volume fraction of conductive material 182 is more than approximately 0.1%, more than approximately 1%, or more than approximately 10%. The volume fraction of conductive material 182 may be calculated with respect to the volume of the carrier 184 or with respect to the volume of the conductive film 180.

The conductive network formed by conductive material 182 may also be constructed in a regular pattern or a random pattern on or within the carrier 184. Depositing the conductive material 182 in a regular pattern may enable the conductive film 180 to maintain its temperature change properties during a plurality of build cycles and over multiple build processes, which may allow the resulting heater 170a to have greater durability than when the conductive material 182 is deposited in the random pattern or simply as a random deposit. A regular network of nanowires may have greater durability than a random network of nanowires, as a random network may lose connectivity at junctions after repeated forces are exerted thereon. The loss of connectivity can result in a corresponding loss of conductivity, a change in resistance and a change in the temperature change properties of the heater 170a.

The conductive material 182 may also be deposited on or within the carrier 184 or further processed after deposit to achieve a particular thickness. The thickness of the conductive material 182 may affect the intensity or the amount of heat energy and the uniformity of heat energy generated by the heater 170a, as the conductive material 182 at a greater thickness may have greater conductivity and generate greater and more uniform heat when compared to the same conductive material 182 at a smaller thickness. The conductive material 182 may be deposited or processed after deposit to have a thickness between approximately 0.1 μm and 1000 μm. The thickness of the conductive material 182 may also affect the optical transmittance of the resulting heater 170a, as the conductive material 182 at a greater thickness may have lower total transmittance when compared to the same conductive material 182 having a smaller thickness. The conductive material 182 may also be deposited or processed after deposit to achieve substantially uniform thickness across the heating interface 176, such that the thickness of the conductive material 182 is maintained within a reasonable deviation for each square linear dimension of the heater area 172 forming the heating interface 176. The conductive material 182 may be deposited or processed after deposit to achieve ±10% variation in a specified thickness across each square linear dimension of the heater area 172 (such as ±10% variation in a specified thickness of approximately 200 μm for each square centimetre of the heater area 172). Achieving a substantially uniform thickness of the conductive material 182 across the heater area 172 may allow the conductive film 180 to generate substantially uniform heat energy across the entire heating interface 176 to allow the resulting heater 170a to satisfy the uniformity criteria.

As generally described above, the application method, the pattern, the concentration, the thickness and the surface roughness of the conductive material 182 can affect one or more of the conductivity and resistance, optical transmittance, flexibility and durability of the conductive film 180, and each of these variables may be selected to provide the conductive film 180 with one or more of (a) a specific conductivity, resistance and power density to allow the resulting heater 170a to satisfy the temperature change threshold, (b) a specific transmittance to allow the resulting heater 170a to satisfy the transparency threshold, (c) flexibility to allow the resulting heater 170a to satisfy the flexibility threshold, and (d) durability to allow the resulting heater 170a to satisfy the durability threshold. Additionally, these above variables combined with different combinations of types of conductive materials and different dimensional structures of conductive materials may further allow more granular adjustment of the conductivity and resistance, transparency, flexibility and durability of the resulting heater 170a.

As a specific examples, in the embodiment shown in FIG. 4B, the conductive material 182 comprises a metal-based nanowire or microwire 182b constructed in a regular network and deposited on the carrier 184 at a concentration sufficient to reach a percolation threshold of the nanowire or microwire 182b. Depositing the nanowire or microwire 182b at the concentration to reach the percolation threshold can allows the conductive film 180 to generate sufficient heat energy and sufficiently uniform heat energy to allow the resulting heater 170a to satisfy the power criteria and the uniformity criteria. In the embodiment shown, the nanowire or microwire 182b is formed from a copper-based metal and has an average diameter of less than 100 μm and an aspect ratio of length:diameter of more than 10. In other embodiments, the nanowire or microwire 182b may be formed from nickel, silver, or an alloy combination thereof, and may have an aspect ratio of more than 100 or more than 1000. Nanowires or microwires having such diameters and such aspect ratios may provide the conductive film 180 with optical transmittance to allow the resulting heater 170a to satisfy the transparency threshold. In the embodiment shown, the percolation threshold of the nanowire or microwire 182b is achieved when the volume fraction of nanowire or microwire 182b present in the carrier 184 is approximately 0.1%, or the weight density of nanowire or microwire 182b across the heater area 172 is approximately 5 mg/m$^2$; however, the percolation threshold of the nanowire or microwire 182b may vary depending on the specific type of material and the specific dimensions of the nanowire or microwire 182b. Examples of silver and copper nanowires or microwires include Chasm-AgeNT-AM210 copper wire mesh, Chasm-AgeNT-AW121 silver nanowire, Chasm-AgeNT-AW210 silver nanowire and Dycotec Material DM-SNW-8010S silver nanowires.

Figure 4A:
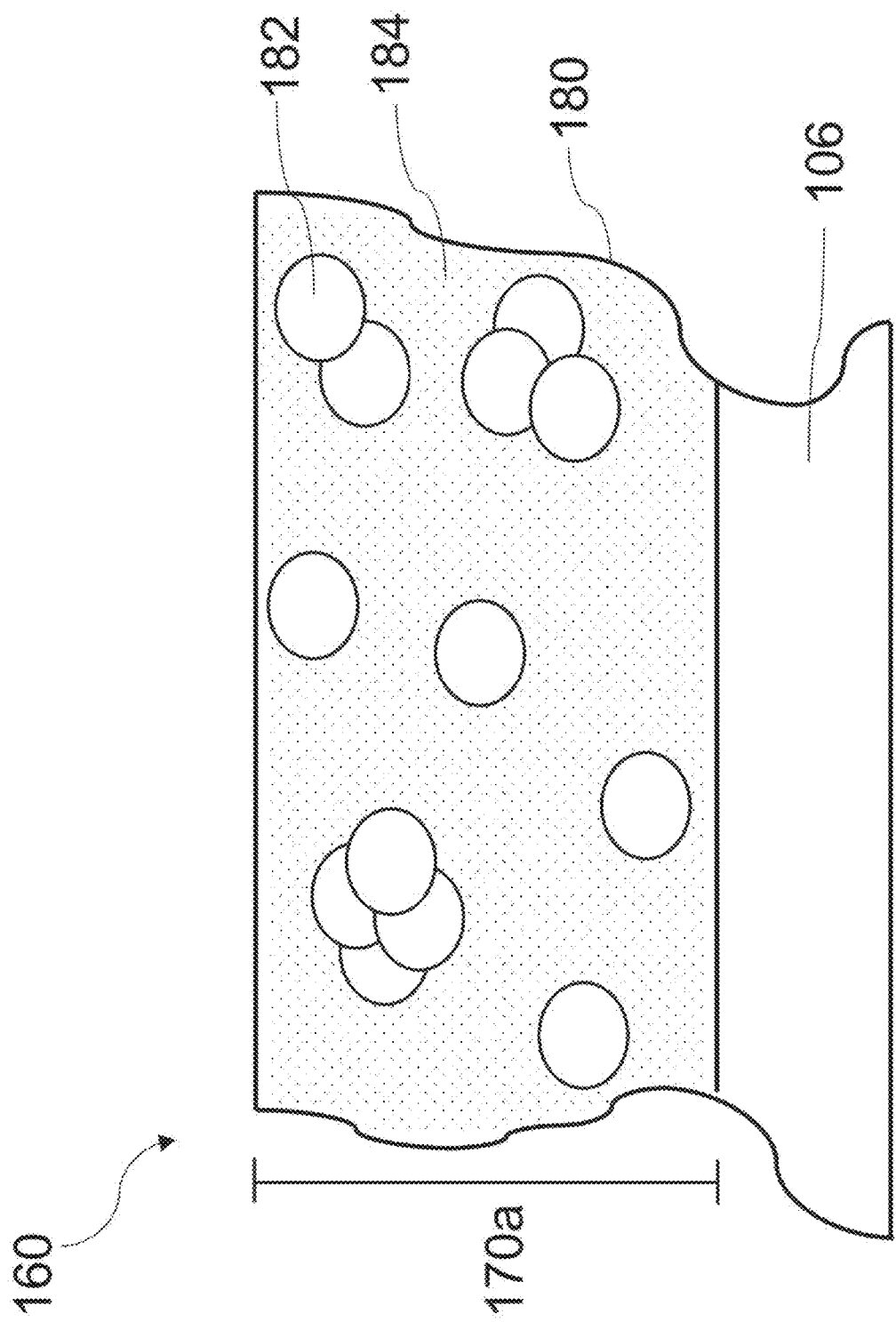
Figure 4C:
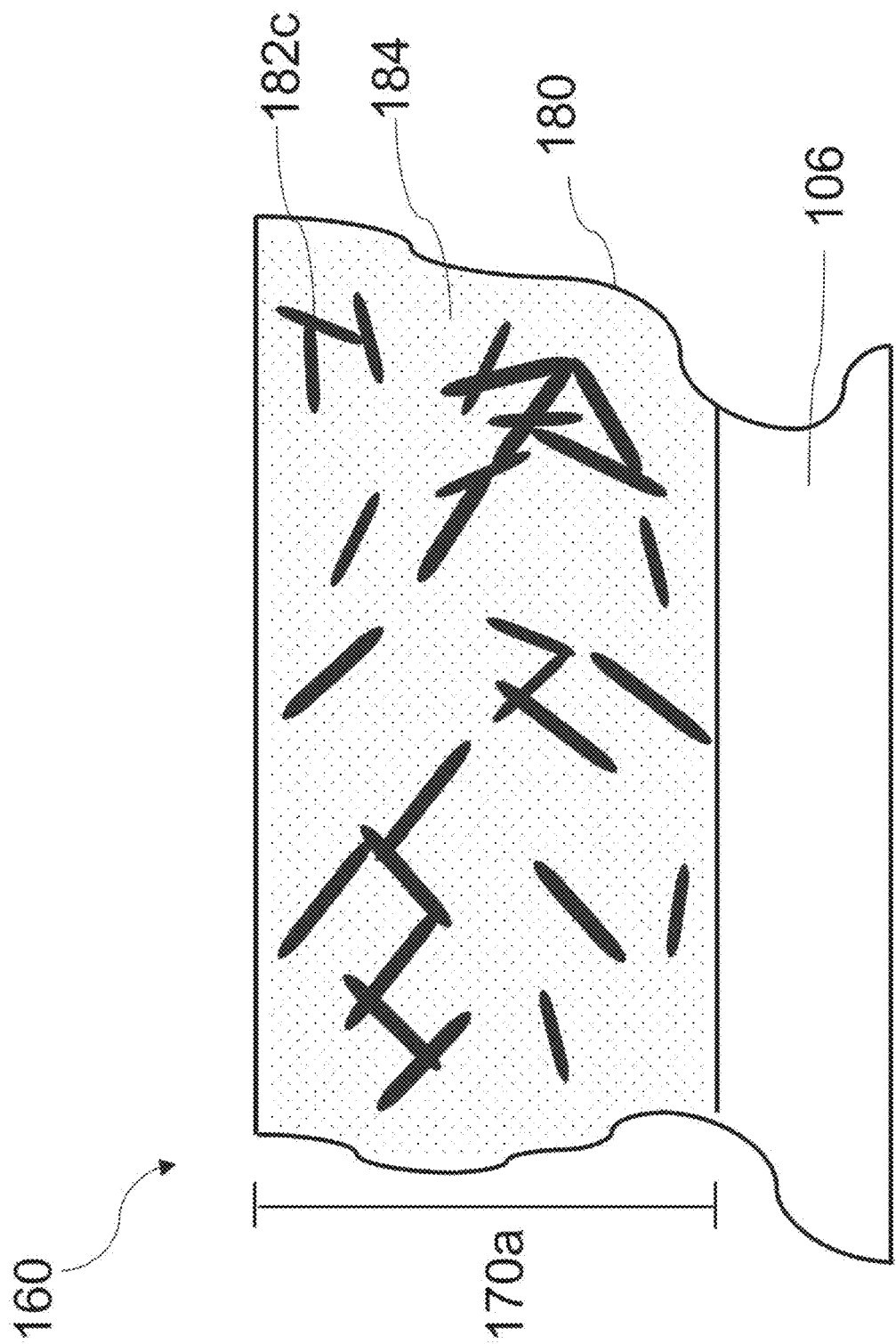

In the embodiment shown in FIG. 4C, the conductive material 182 comprises nanotubes 182c, which may be constructed in a random network and may be deposited at a concentration sufficient to reach a percolation threshold of the nanotubes 182c. Similar to the nanowires or microwires 182b, depositing the nanotubes 182c at the concentration to reach the percolation threshold can allow the conductive film 180 to generate sufficient heat energy and sufficiently uniform heat energy for the resulting heater 170a to satisfy the power criteria and the uniformity criteria. In the embodiment shown, the nanotubes 182c are carbon nanotubes and have an average length of less than 50 μm and an average diameter of 20 nm. Nanotubes having such lengths and such diameters may provide the conductive film 180 with optical transmittance to allow the resulting heater 170a to satisfy the transparency threshold. In other embodiments, the nanotubes 182c may be made from other types of conductive materials or have other dimensions. In the embodiment shown, the percolation threshold of the nanotubes 182c is achieved when the volume fraction of nanotubes 182c present in the carrier 184 is approximately 0.1% or the weight density of nanotubes 182c across the heater area 172 is approximately 5 mg/m$^2$; however, the specific percolation threshold of the nanotubes 182c may vary depending on the specific type of material and the specific dimensions of the nanotubes 182c. Examples of carbon nanotubes include Chasm-AgeNT-VC200 and Chasm-AgeNT-VC201 carbon nanotube ink.

The conductive material 182 may comprise a first conductive material and a second conductive material. The first and second conductive materials may be of a same or different type of conductive material, may have a same or different nanostructures, may be applied using a same or different application methods, may be applied to form a same or different patterns, may be present in a same or different concentrations. Other embodiments of the conductive material 182 may comprise more than two conductive materials, more than three conductive materials or more than three conductive materials.

Figure 4D:
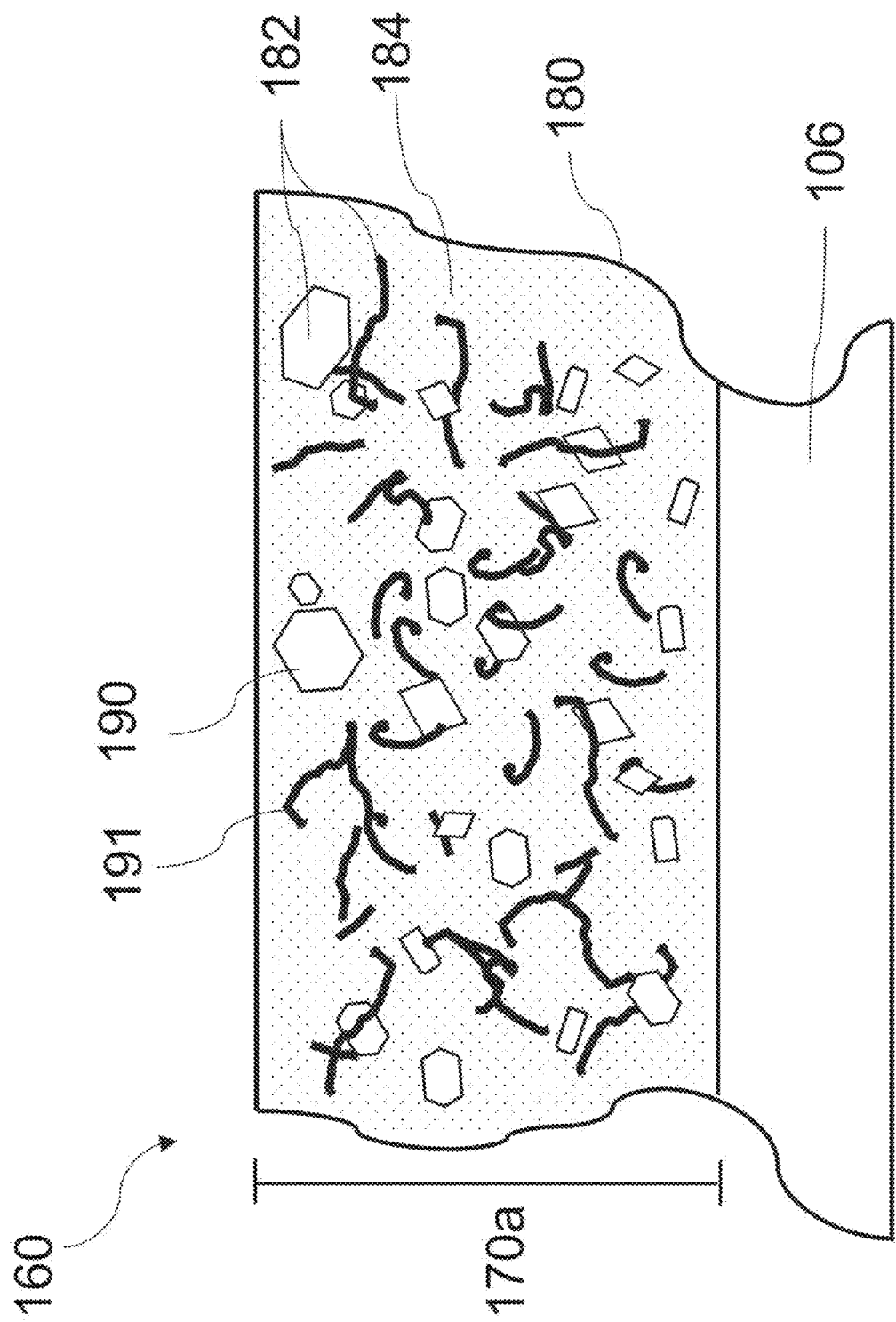

As specific examples, in the embodiment shown in FIG. 4D, the conductive material 182 comprises a first conductive material 190 having a first nanostructure and a second conductive material 191 having a second nanostructure different from the first nanostructure, and in particular has a dimensional nanostructure different from the first nanostructure. In the embodiment shown, the first conductive material 190 comprises 2D silver nanoflakes and the second conductive material 191 comprises 1D silver nanowires, such that the first and second conductive materials 190 and 191 have different nanostructures but are formed from a same type of conductive material. Combining conductive material 182 having different dimensional nanostructures may provide the conductive film 180 with greater flexibility and greater durability when compared to conductive films having conductive material with only a single dimensional nanostructure. In other embodiments, the first and second conductive materials 190 and 191 may have any type of different dimensional nanostructures, and may comprise a same or different types of conductive material.

Figure 4E:
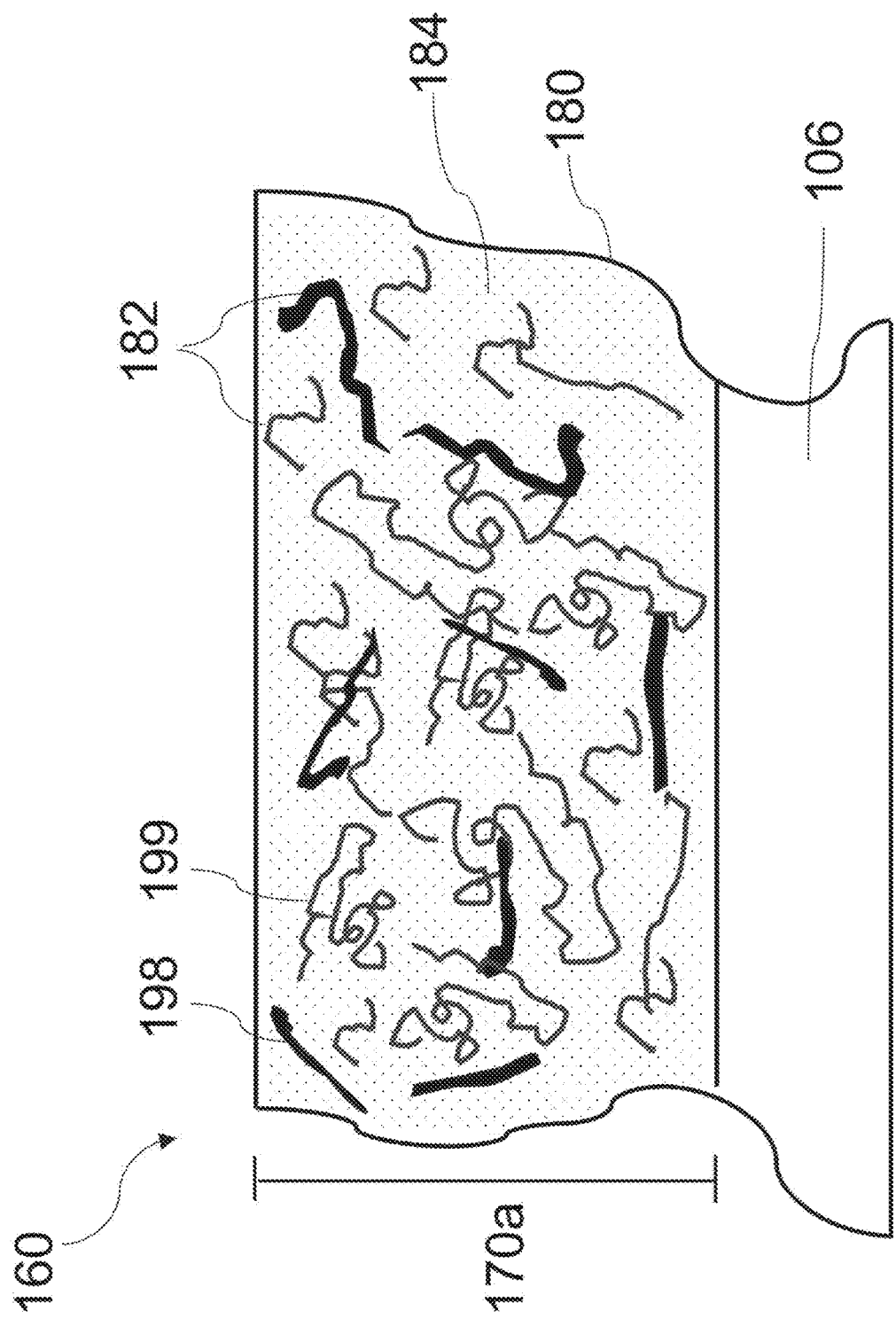

In the embodiment shown in FIG. 4E, the conductive material 182 comprises a first conductive material 198 having a first nanostructure and a second conductive material 199 having a second nanostructure that is the same as the first nanostructure. In the embodiment shown, the first conductive material 198 may comprise 1D silver nanowires and the second conductive material 199 may comprise 1D copper nanowires, such that the first and second conductive materials 198 and 199 both comprise 1D nanostructures but are formed of different types of conductive material. In other embodiments, the first conductive material 198 may comprise ultra-long 1D silver nanofibers having an average diameter of 400 nm and an aspect ratio of more than 1000 while the second conductive material 199 may comprise 1D silver nanowires having an average diameter of 30 nm and an aspect ratio of more than 100, such that the first and second conductive materials 198 and 199 both comprise 1D nanostructures formed of a same material but have different dimensions. In other embodiments, the first and second conductive materials 198 and 199 may have any type of a same nanostructure, may comprise a same or different types of conductive material, and may comprise a same or different dimensions.

Figure 4F:
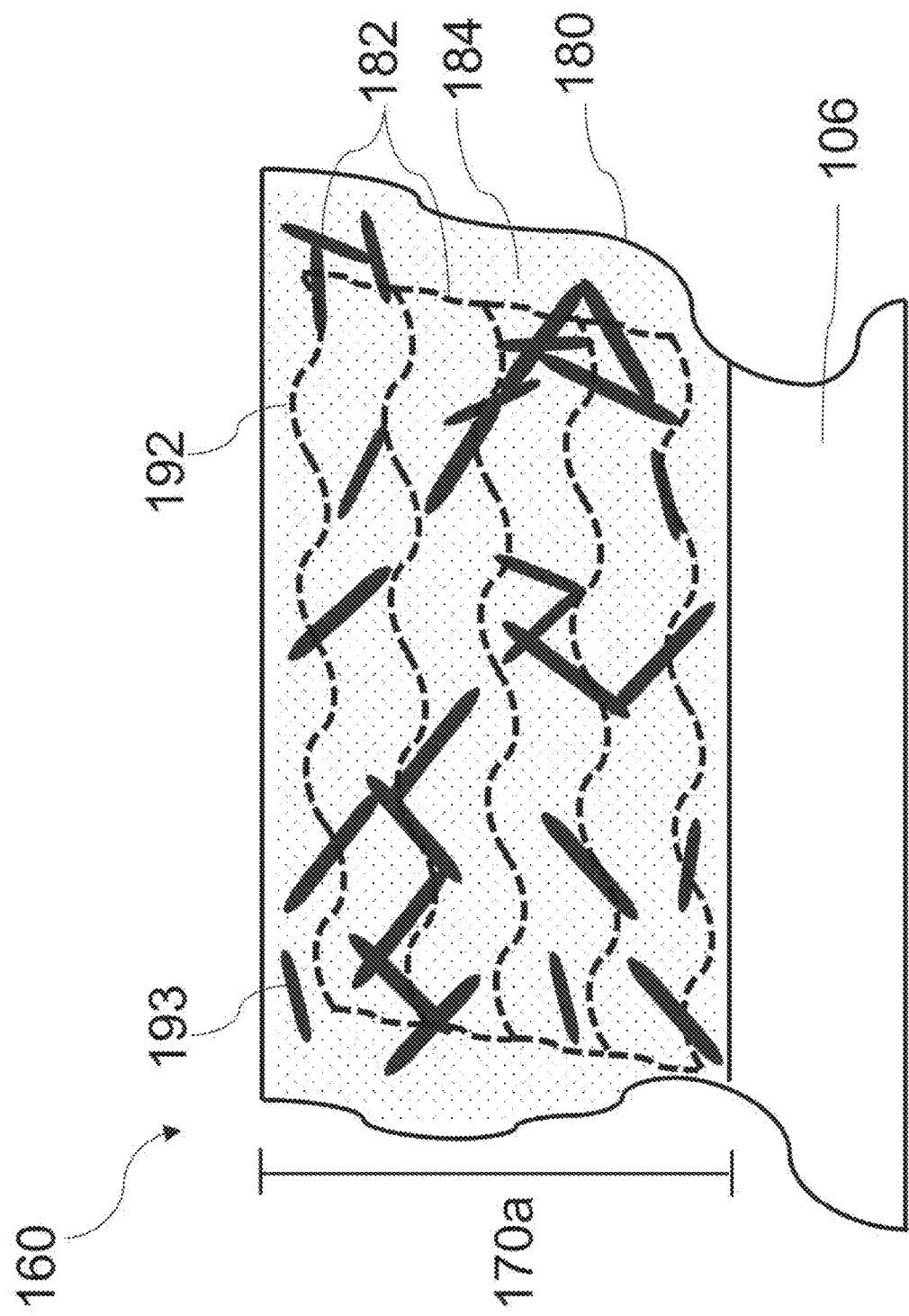

In the embodiment shown in FIG. 4F, the conductive material 182 comprises a first conductive material 192 and a second conductive material 193, where the first conductive material 192 may be deposited in a regular pattern and the second conductive material 193 may be deposited on the regular pattern of the first conductive material 192 in a random pattern or as a random deposit. The first conductive material 192 comprises copper microwires forming the regular pattern and the second conductive material 193 comprises carbon nanotubes deposited on to the regular pattern formed by the copper microwires 192 in the random pattern. In the embodiment shown, the carbon nanotubes 193 have an average length of less than 50 μm and an average diameter of 20 nm and the copper microwires 192 have an average diameter of approximately 50 μm and an aspect ratio of more than 1000. The carbon nanotubes 193 may be deposited on the regular pattern of the copper microwires 192 at a concentration sufficient to reach a percolation threshold of the carbon nanotubes 193. In the embodiment shown, the percolation threshold of the carbon nanotubes 193 is achieved when the volume fraction of the carbon nanotubes 193 present in the carrier 184 is approximately 0.1% or the weight density of the carbon nanotubes 193 across the heater area 172 is approximately 5 mg/m$^2$. The regular pattern of the copper microwires 192 and the random pattern of the carbon nanotubes 193 may be pressed rolled together. In other embodiments, the first conductive material 192 may comprise silver nanowires formed as the regular pattern and the second conductive material 193 may comprise graphene nanosheets formed as the random pattern. The graphene nanosheets may be deposited onto the regular pattern of the silver nanowires by selective electrodeposition followed by pulsed laser irradiation treatment. In other embodiments, the first and second conductive materials 192 and 193 may have any type of a same or different nanostructures, may comprise a same or different types of conductive material, and may comprise a same or different dimensions.

In the embodiment shown in FIG. 4G, the conductive material 182 comprises a first conductive material 194 and a second conductive material 195, where the first conductive material 194 and the second conductive material 195 collectively form a regular network. In the embodiment shown, the first conductive material 194 comprises silver nanowires and second conductive material 195 comprises copper microwires. The silver nanowires 194 have an average diameter of less than 100 nm and an aspect ratio of more than 150 and the copper microwires 195 have an average diameter of less than 50 μm and an aspect ratio of more than 1000. Accordingly, the first and second conductive materials 194 and 195 have a same nanostructure but are made of a different types of conductive material and have different dimensions. The silver nanowires 194 and the copper microwires 195 may be combined to construct the regular pattern and then deposited on or with the carrier 184. In other embodiments, the first conductive material 194 may comprise silver nanowires having an average diameter of less than 80 nm and an aspect ratio of more than 100, while the second conductive material 195 may comprise silver nanowires having an average diameter of less than 3 nm and an aspect ratio of more than 50, such that the first and second conductive materials 194 and 195 are made of a same type of conductive material with a same nanostructure, but have different dimensions. In yet other embodiments, the first and second conductive materials 192 and 193 may have any type of a same or different nanostructures, may comprise a same or different types of conductive material, and may comprise a same or different dimensions.

Figure 4H:
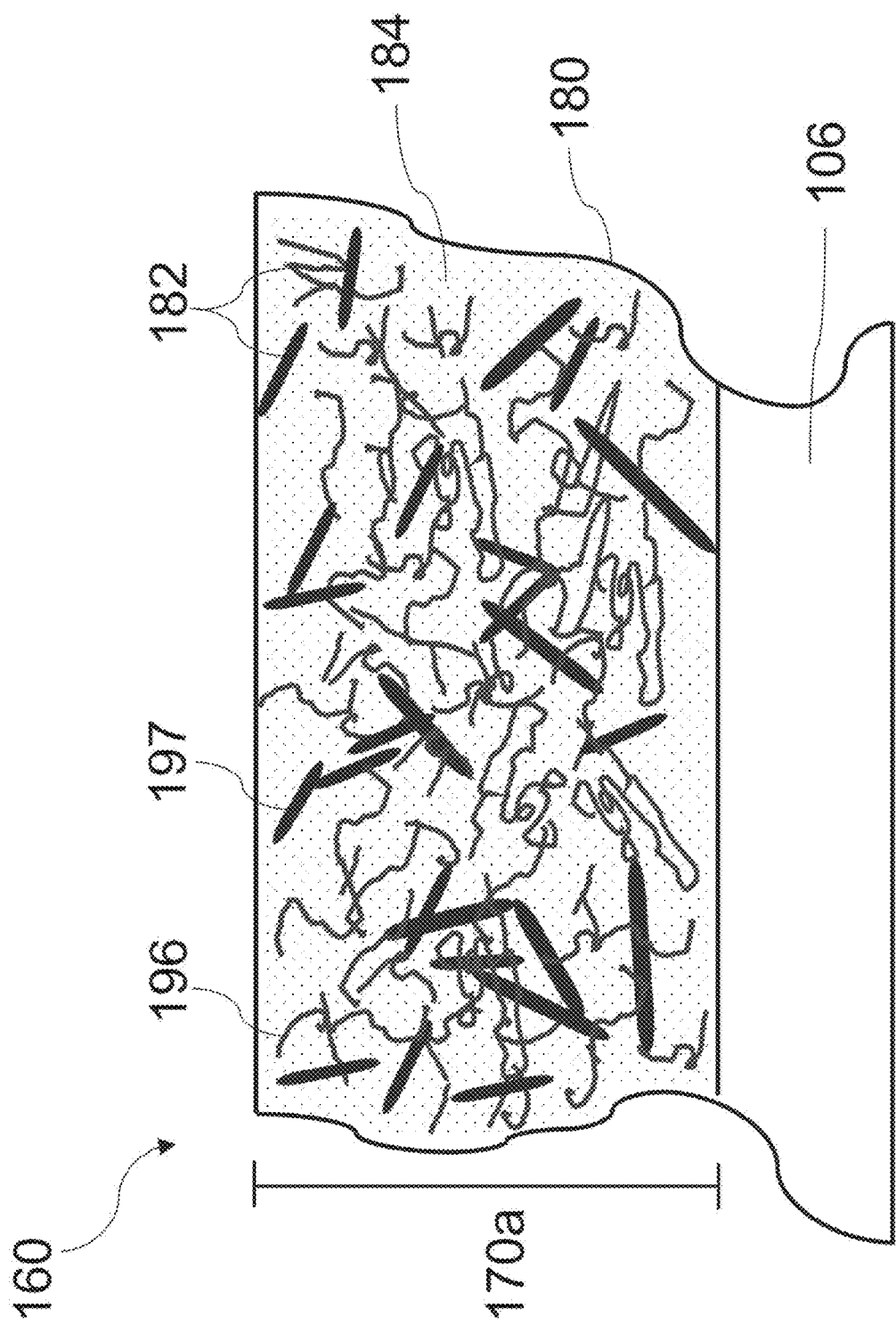

In the embodiment shown in FIG. 4H, the conductive material 182 comprises a first conductive material 196 and a second conductive material 197, wherein the first conductive material 196 and the second conductive material 197 are both deposited as a random network or as a random deposit. In the embodiment shown, the first conductive material 196 comprises silver nanowires deposited on or within the carrier 184 as a random network and at a concentration above a percolation threshold of the silver nanowires 196. In the embodiment shown, the silver nanowires 196 have an average diameter of less than 100 nm and an aspect ratio of more than 10, and the percolation threshold of the silver nanowires 196 is achieved when the volume fraction of the silver nanowires 196 present in the carrier 184 is approximately 0.1% or the weight density of the silver nanowire 196 across the heater area 172 is approximately 5 mg/m$^2$. The second conductive material 197 comprises carbon nanotubes randomly deposited on or within the random network of the silver nanowire 196. In other embodiments, the first and second conductive materials 196 and 197 may be deposited at a concentration sufficient to reach a percolation threshold of the combination of the first and second conductive materials 196 and 197. The percolation threshold of the combination of the first and second conductive materials 196 and 197 may be different (and may specifically be lower) than the percolation threshold of either the first or the second conductive materials 196 and 197 individually, and using both the first and second conductive materials 196 and 197 may allow the conductive film 180 to satisfy the temperature change threshold while maintaining a lower thickness and greater optical transparency. For example, the dimensions and aspect ratio of the silver nanowires 196 are described above, and the carbon nanotubes 197 may have an average length of less than 50 μm and an average diameter of 20 nm. The percolation threshold of the combination of the silver nanowires 196 and the carbon nanotubes 197 may be achieved when the volume fraction of a combination of the silver nanowires 196 and the carbon nanotubes 197 present in the carrier 184 is less than approximately 0.1% or the weight density of the combination of the silver nanowires 196 and the carbon nanotubes 197 across the heater area 172 is less than approximately 5 mg/m$^2$. In other embodiments, the first conductive material 196 may comprise silver nanowires deposited as a random network and the second conductive material 197 may comprise copper microwires also deposited as a random network, wherein the silver nanowires and copper microwires are deposited at a concentration above a percolation threshold of the combination of the silver nanowires and the copper microwires. In other embodiments, the first and second conductive materials 196 and 197 may have any type of a same or different nanostructures, may comprise a same or different types of conductive material, and may comprise a same or different dimensions.

Non-limiting examples of material which may form the carrier 184 include silicone, glass, polyester terephthalate (PET), polycarbonate (PC), polyimide, fluorinated ethylene propylene (FEP), fluoropolymers, Teflon AF2400, Teflon AF1600, polytetrafluoroethylene (PTFE), polyethylene napthalate (PEN), polyacrylate, acrylic, polyester, triacetate, polyethylene (PE), cyclic olefin polymer (COP), cyclic olefin copolymer (COC) and polypropylene (PP). Different types of material may have different conductivity, different resistance, different power densities, different transmittance, different flexibility and different durability. The material of the carrier 184 may be selected, in combination with the conductive material 182, to provide the conductive film 180 with one or more of (a) a specific conductivity and resistance to allow the resulting heater 170a to satisfy the temperature change threshold, (b) a specific transmittance to allow the resulting heater 170a to satisfy the transparency threshold, (c) flexibility to allow the resulting heater 170a to satisfy the flexibility threshold, and (d) durability to allow the resulting heater 170a to satisfy the durability threshold.

In some embodiments, the conductive film 180 may be existing conductive films. Examples include:
Kodak HCF film/ESTAR base coated with PEDOT:PSS;
TDK Ag-stacked film with Ag alloy (having a sheet resistance of 7Ω/□);
Minco Thermal-Clear™ with 20 μm diameter resistive wire;
Canatu Carbon nanobud CNB™ film with elastic carbon nanotube;
Dontech Therma Klear™ series transparent heaters (having a sheet resistance of <1Ω/□);
Chasm transparent film AgeNT-10, AgeNT-30, AgeNT-75;
Chasm AgeNT-1 hybrid transparent conductive film; and
Microcontinuum™ nanoMesh transparent conductive film.

Figure 4I:
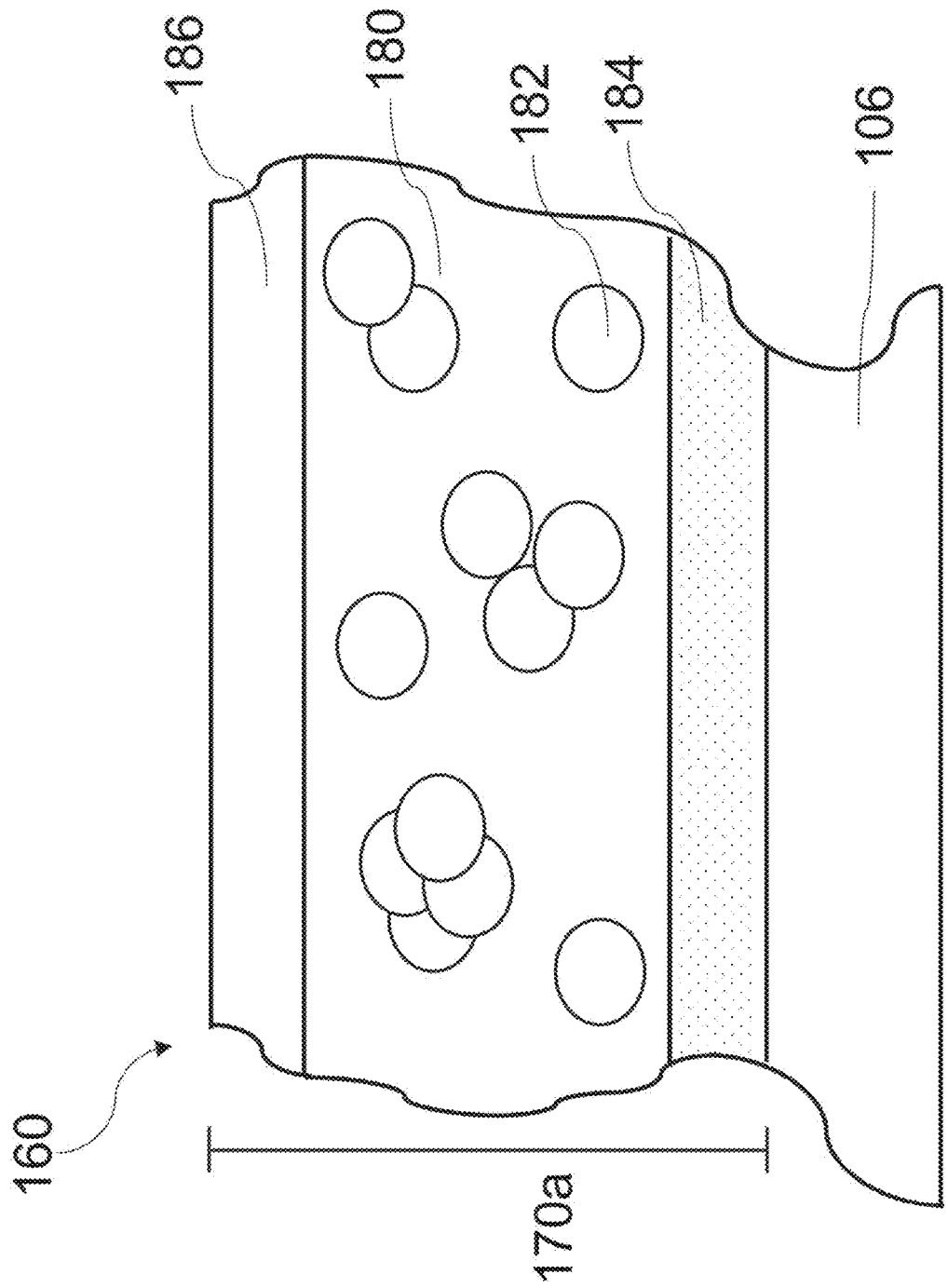

Referring now to FIG. 4I, some embodiments of the conductive film 180 also include a protective layer 186 positioned on top of the conductive material 182. The protective layer 186 may protect the conductive material 182 from being damaged or irreversibly deformed as forces are exerted on (or otherwise experienced by) the interface assembly 160 during a plurality of build cycles or over multiple build process. The protective layer 186 may also protect the conductive film 180 from oxygen or moisture within the build chamber 101 and reduce oxidation of the conductive material 182. The protective layer 186 may also contribute to the flexibility and durability of the conductive film 180 by providing additional material strength. Non-limiting examples of materials which may be used to form the protective layer 186 comprise PET, PC, polyimide, FEP, PTFE, PEN, PE, polyacrylate, silicone, silicone hydrogel, polymethylpentene (TPX), fluoropolymers, Teflon AF2400, Teflon AF1600 and Dycotec Material DM-OC-6030S overcoat.

Figure 4J:
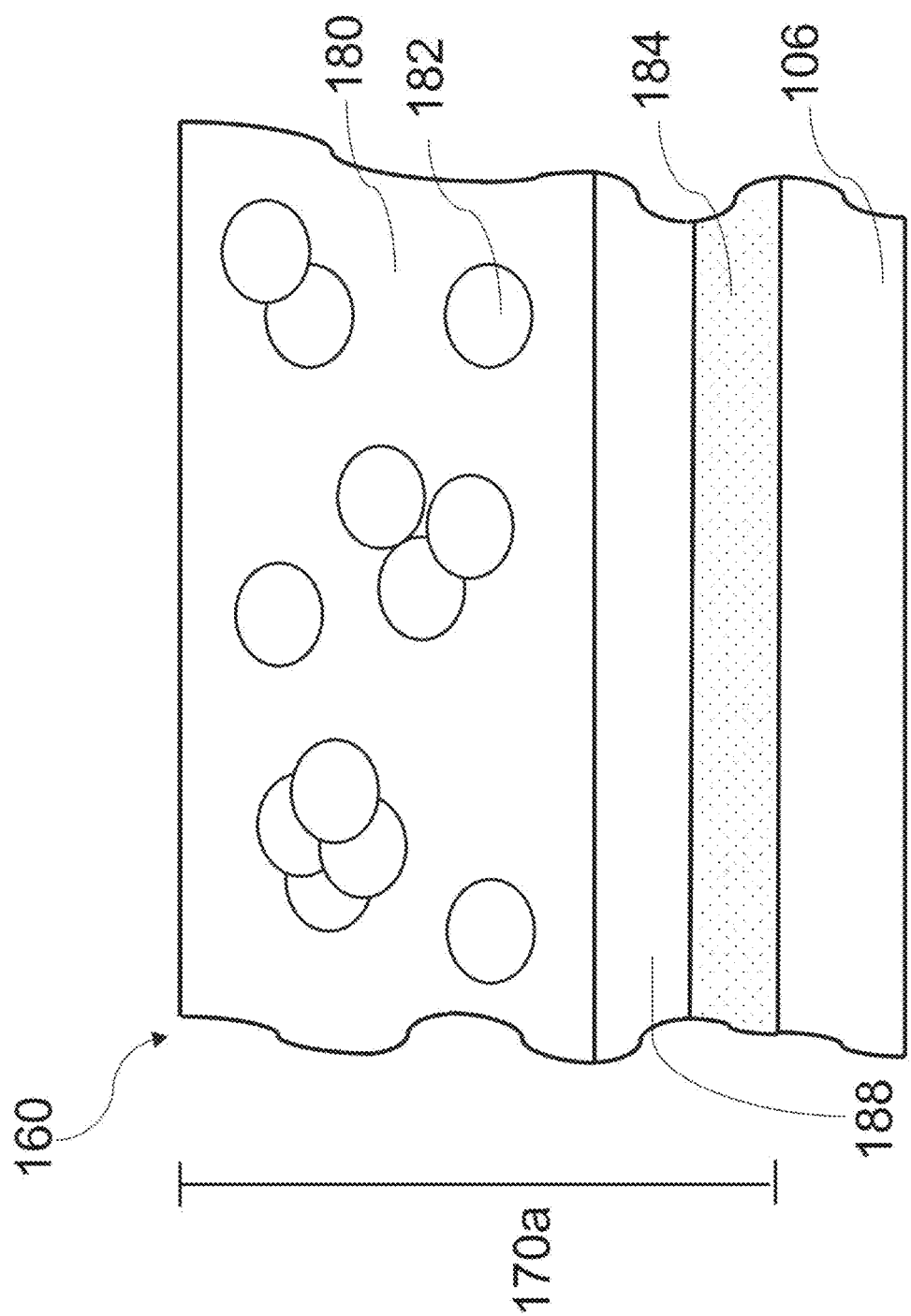

Referring now to FIG. 4J, some embodiments of the conductive film 180 may also include a dielectric layer 188 positioned between the conductive material 182 and the carrier 184. The dielectric layer 188 may insulate the conductive material 182 from the carrier 184 by preventing flow of electrons from the conductive material 182 to the carrier 184. The dielectric layer 188 may improve the durability of the conductive film 180, and may also prevent the conductive film 180 from short-circuiting via the carrier 184. In other embodiments, the conductive film 180 may include dielectric material positioned between the conductive material 182 of a single layer (such as between a plurality of sub-heaters 230a-230e shown in FIG. 6 or between a plurality of sub-heaters 240a-240i shown in FIG. 7) or between different types of the conductive material 182 (such as between the first conductive material 190, 198, 192 and 196 and the second conductive material 191, 199, 193 and 197 shown in FIGS. 4D-4H). In other embodiments, the conductive film 180 may include the dielectric layer 188 positioned between the conductive material 182 and the protective layer 186 (shown in FIG. 4I). Non-limiting examples of material which may be used to form the dielectric layer 188 include glass, polycarbonate, Teflon, polyimide, silicone, polyester and PTFE, with or without thermoset acrylic adhesive.

In some embodiments (not shown), optical coatings such as anti-reflective or anti-refractive coatings can be applied to any component of the heater 170, including without limitation, the carrier 184, the protective layer 186 and the dielectric layer 188, to mitigate reflection from surfaces of the components of the heater 170 and promote transmittance of radiation through the heater 170 to allow the heater 170 to satisfy the transparency threshold.

Figure 5:
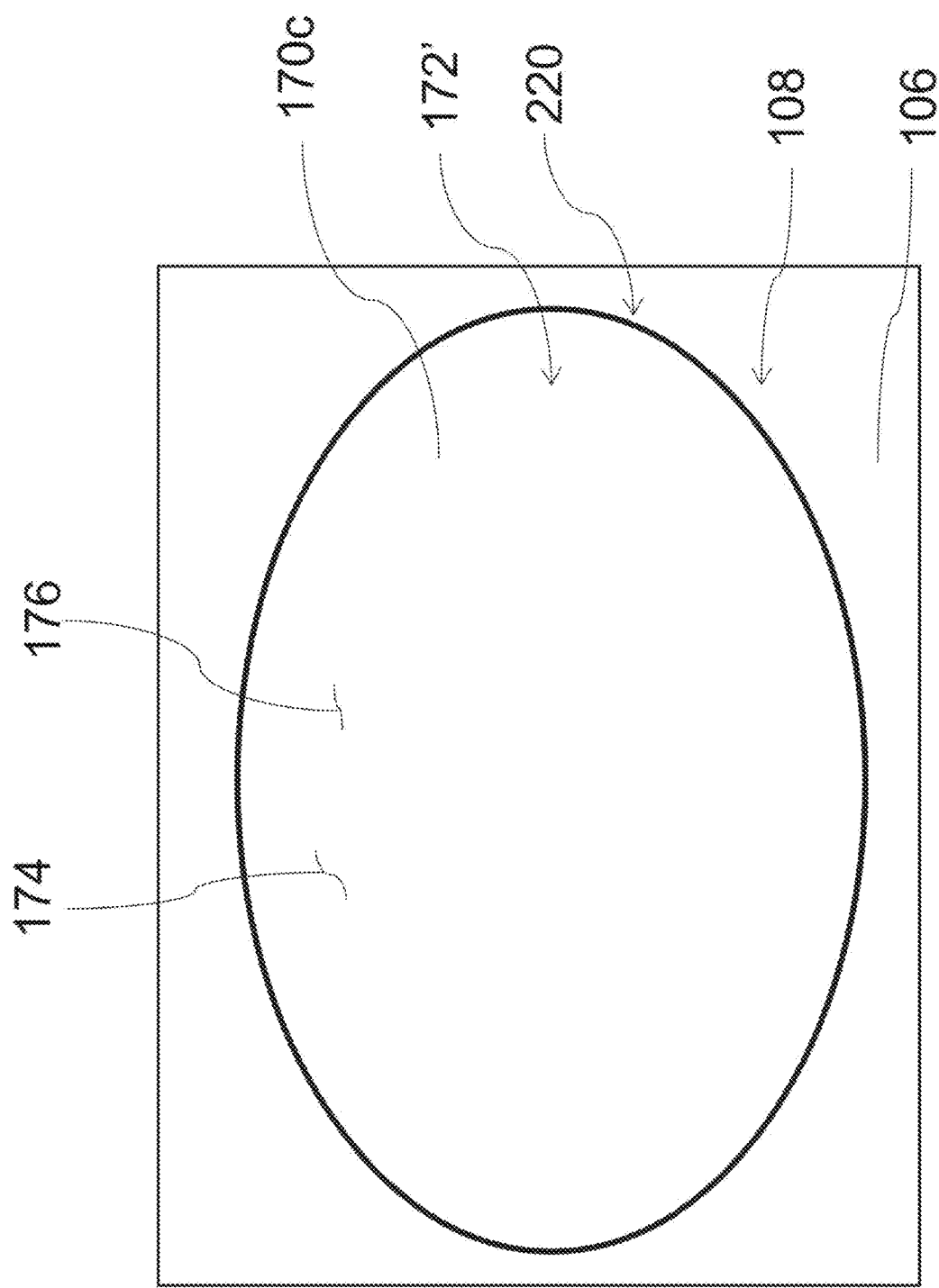
FIG. 5 is a plan view of an interface assembly of the additive manufacturing device of FIG. 1 according to another embodiment.

As described above, and referring briefly back to FIG. 2, the heater 170 is dimensioned to cover substantially the entire build area 108 such that the heater area 172 is dimensioned to substantially correspond to the build area 108. In other embodiments, the heater 170 may instead be dimensioned and positioned to change a temperature of the feedstock 110 at the reaction interface 112 over only a portion of the build area 108. Referring to FIG. 5, the heater 170 comprises a smaller heater 170c. The heater 170c has a heater area 172' smaller than the build area 108 and may cover approximately 70% of the build area 108. In other embodiments, the heater area 172' may cover at least 90%, at least 80%, at least 60% or at least 50% of the build area 108. In the embodiment shown, the heater area 172' has a substantially oval shape. In other embodiments, the heater area 172' may have a circular, triangular, rectangular, square or a polygon shape instead. Similar to the heater 170 shown in FIG. 2, the heater 170c also has the top surface 174 constructed or configured to heat the feedstock 110 to a target temperature (or to above a threshold temperature) when the feedstock 110 is within the container 102, such that the top surface 174 forms the heating interface 176.

The heater 170c may be positioned to heat the feedstock 110 at the reaction interface 112 over a high-build region 220 of the build area 108 where polymerization of the feedstock 110 is expected to occur more frequently during a majority of possible build cycles when compared to other regions of the build area 108. In the embodiment shown, the high-build region 220 corresponds to a central region of the build area 108. Reducing the heater area 172' can reduce manufacturing costs for the heater 170c. In other embodiments, the heater 170 instead be positioned to heat the feedstock 110 at the reaction interface 112 over low-build regions (not shown) of the build area 108 where polymerization is expected to occur infrequently during a majority of possible build cycles. The feedstock 110 over the low-build region(s) may be exposed to fewer heat generating exothermic polymerization reactions when compared to the high-build region 220 and may generally be at a lower temperature when compared to the feedstock 110 over the high-build region 220, and may need to receive the heat energy from the heater 170 to reach the target temperature (or to exceed the threshold temperature).

The heater 170 may comprise a plurality of sub-heaters each configured and positioned to heat the feedstock 110 at the reaction interface 112 over only a specific region 109 of the build area 108. In the embodiment shown in FIG. 6, the heater 170 comprises a heater 170d comprising the plurality of sub-heaters 230a-230e having respective sub-heater interfaces 236a-236e configured and positioned to change a temperature of the feedstock 110 at the reaction interface 112 over a respective one of a plurality of regions 109a-109e of the build area 108 independently of the other sub-heaters 230a-230e. Other embodiments may include more or fewer sub-heaters, and may include at least two, at least three, at least four, at least 10, at least 25, at least 50 and at least 100 heaters for example.

Each sub-heater 230a-230e may be independently controlled by (a) the intensity component of a respective heater signal 257 (shown in FIG. 1) to generate heat at a particular intensity, (b) the start time component of the respective heater signal 257 to generate heat at a particular start time in a build cycle, and (c) the interval component of the respective heater signal 257 to generate heat for a particular duration. Using the sub-heaters 230a-230e can improve the granularity of heating across the build area 108 and can enable separate heating of regions 109a-109e which experience high-temperatures versus those that experience low-temperatures during a particular build cycle or over a particular build process. Separate heating of different regions 109a-109e may also maintain the feedstock 110 within the container 102 at the target temperature (or above the threshold temperature) and at the target viscosity (or above the threshold viscosity) more efficiently and consistently. As described above, many types of material used as the feedstock 110 have poor thermal conductivity and certain high-build regions (such as the high-build region 220 shown in FIG. 5 for example) of the build area 108 may undergo more heat generating exothermic polymerization reactions during a particular build cycle than low-build regions of the build area 108. As a result, the feedstock 110 in a low-build region may be at a lower temperature when compared to the feedstock 110 in high-build regions at a same point in time during a build cycle, and may need to receive more heat energy to reach the target temperature.

Each sub-heater 230a-230e has a length and a width defining a respective sub-heater area. In the embodiment shown in FIG. 6, the sub-heater area corresponds to an area of the associated region 109a-109e of the build area 108 that the sub-heater 232a-232e is configured to heat. In other embodiments, the sub-heater areas may be smaller than the areas of associated regions 109a-109e. Additionally, the respective sub-heater areas of each sub-heater 230a-230e have substantially identical shapes and dimensions, and are each a rectangle having a width of approximately 10 cm and a length of approximate 20 cm. However, in other embodiments, different sub-heaters may have shapes and dimensions different than those described above. For example, the sub-heaters may instead have a width of 0.5 centimeters in embodiments having at least 10 sub-heaters, or the sub-heaters may instead have circular configurations or triangular configurations.

In other embodiments, different sub-heaters may have different shapes and different dimensions from other sub-heaters. For example, in the embodiment shown in FIG. 7, the heater 170 is a heater 170e comprising the plurality of sub-heaters 240a-240i. The sub-heaters 240a-240i have respective sub-heater interfaces 246a-246i configured and positioned to change a temperature of the feedstock 110 at the reaction interface 112 over a respective one of a plurality of region 109a'-109i' of the build area 108 independently of the other sub-heaters 240a-240i.

Figure 6:
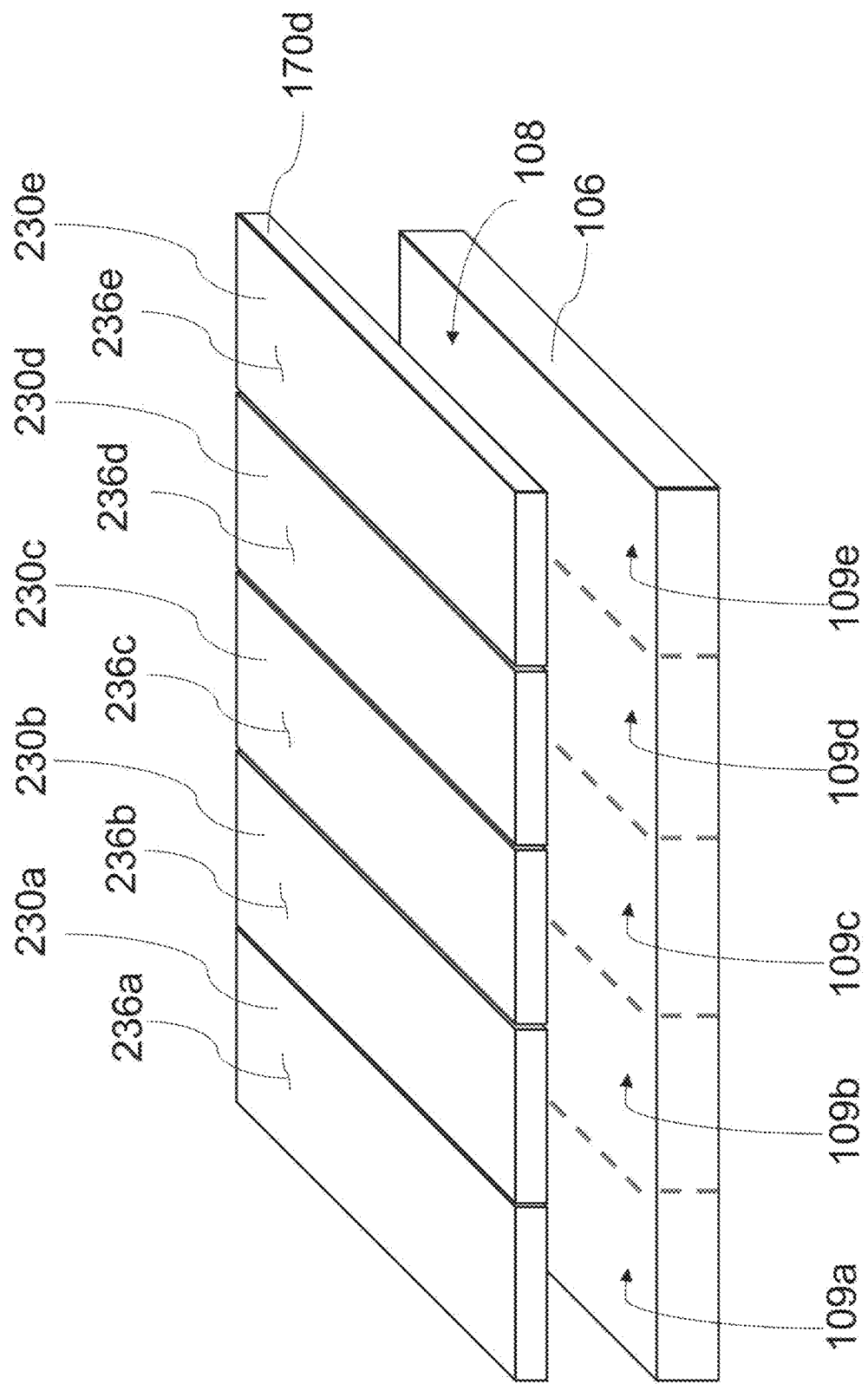
FIG. 6 is a perspective view of an interface assembly of the additive manufacturing device of FIG. 1 according to another embodiment.

Similar to sub-heaters 230a-230e shown in FIG. 6, each sub-heater 240a-240i has a length and a width defining a respective sub-heater area which generally correspond to an area of the associated region 109a'-109i' that the sub-heater 240a-240i is configured to heat. However, unlike the sub-heaters 230*a*-230*e*, the sub-heaters 240*a*-240*i* have different dimensions relative to each other and may have different dimensions depending on its position in the build area 108. For example, the sub-heaters 240*c*-240*g* positioned at regions 109*c'*-109*g'* defining a middle of the build area 108 are smaller than the sub-heaters 240*a*, 240*b*, 240*h* and 240*i* positioned at regions 109*a'*, 109*b'*, 109*h'* and 109*i'* at a periphery of the build area 108. The sub-heater density near the middle is thus greater than the sub-heater density near the periphery, which may provide more granular heating of the regions 109*c'*-109*g'* defining the middle. Such configurations may be used in embodiments where the middle corresponds to a high-build region (similar to the high-build region 220 shown in FIG. 5) where polymerization of the feedstock 110 is expected to occur frequently and may provide heating to increase feedstock 110 mobility for more efficient polymerization by the radiation. In other embodiments, the sub-heaters positioned at regions near the periphery of the build area 108 may be smaller than the sub-heaters positioned at regions near the middle of the build area 108 and the sub-heating heater density near the periphery may be greater than the sub-heater density near the middle. Such configurations may be used in embodiments where the periphery corresponds to a low-build region and may provide for more granular and even heating of the feedstock 110 near the periphery, which may be exposed to fewer heat generating exothermic polymerization reactions and may generally be at a lower temperature when compared to the feedstock 110 near the middle at a same point in time during a build cycle, to the target temperature. In yet other embodiments, the sub-heaters may have shapes and dimensions different than those described above, and may include internal openings such that adjacent sub-heaters are nested within each other, for example.

The heater 170 may also have different construction across the heater area 172 depending on position in the build area 108. In the embodiment shown in FIG. 8, the heater 170 is a heater 170*f* comprising a plurality of heater regions 250*a*-250*d* generally arranged vertically across the heater area 172. The heater regions 250*a*-250*d* have respective sub-heater interfaces 256*a*-256*d* configured and positioned to change a temperature of the feedstock 110 at the reaction interface 112 over a respective one of a plurality of regions 109*a''*-109*d''* of the build area 108. Other embodiments may include more or fewer heater regions, and may include at least two, at least three, at least four, at least 10, at least 25, at least 50 and at least 100 heater regions for example. Other embodiments may also include the heater regions in different arrangements, such as horizontally across the heater area 172, diagonally across the heater area 172, or nested within each other for example.

Each heater region 250*a*-250*d* has a length and a width defining an area of the respective heater region. The respective heater region area generally corresponds to an area of the associated region 109*a''*-109*d''* of the build area 108 that the heater region 250*a*-250*d* is configured to heat. In other embodiments, the area of the heater region may be smaller than the areas of associated regions 109*a''*-109*d''*. Additionally, in the embodiment shown, the heater regions 250*a*-250*d* have substantially identical shapes and substantially similar dimensions, and are each a rectangle having a width of approximately 12.5 cm and a length of approximately 20 cm. In other embodiments, different heater regions may have different shapes and different dimensions from other heater regions, and may also have shapes and dimensions different than those described above, such as circular configurations, triangular configurations or may include internal openings such that some heater regions are nested within each other for example.

The different heater regions 250*a*-250*d* may be constructed to have different power densities and/or different sheet resistances from each other, such that the different heater regions 250*a*-250*d* generate different intensities or different amounts of heat energy when a same input current or same input voltage is applied to the heater 170*f* using the external power source (not shown). The different heater regions 250*a*-250*d* may have different power densities and different sheet resistances due to different construction and configuration of the conductive material 182 within each heater region 250*a*-250*d*. For example, the different heater regions 250*a*-250*d* may include the conductive material 182 deposited using different application methods, at different concentrations, at different thicknesses, and at different surface roughnesses. The different heater regions 250*a*-250*b* may also include the conductive material 182 having different nanostructures (such as nanowire versus nanotube for example), or a same nanostructure having different dimensions (such as an ultra-long nanofiber having an average diameter of 400 nm and an aspect ratio of more than 1000 versus an nanowire having an average diameter of 30 nm and an aspect ratio of more than 100 for example), or different types of material (such as copper versus carbon for example). In yet other embodiments, the different power densities and different sheet resistances may be due to differences in other components of the heater 170*f*, such as the existence of a dielectric layer (such as the dielectric layer 188 shown in FIG. 4J) or a protective layer (such as the protective layer 186 shown in FIG. 4I) in some heater regions but not others.

Using the different heater regions 250*a*-250*d* can improve the granularity of heating across the build area 108 and can enable differential heating of different regions 109*a''*-109*d''* to maintain the feedstock 110 at the target temperature (or above the threshold temperature) and at the target viscosity (or to exceed the threshold viscosity). As described above, many types of material used as the feedstock 110 have poor thermal conductivity and certain regions of the build area 108 may experience more exothermic polymerization reactions than other regions, resulting in different portions of the feedstock 110 being at different temperatures at a same point in time. The heater 170*f* may be constructed and configured to generate greater heat energy in low-build regions (having the feedstock 110 at lower temperatures) and less heat energy in the high-build regions (having the feedstock 110 at higher initial temperatures). In the embodiment shown in FIG. 8, the peripheral regions 109*a''* and 109*d''* may represent low-build regions, while the central regions 109*b''* and 109*c''* may represent high-build regions. The conductive material 182 in the peripheral heater regions 250*a* and 250*d* (positioned to heat the peripheral regions 109*a''* and 109*d''*) may be of a type with greater conductivity and/or may be deposited or processed to have a higher concentration, a greater thickness and/or a higher surface roughness when compared to the conductive material 182 in the central heater regions 250*b* and 250*c* (positioned to heat the central regions 109*b''* and 109*c''*). For example, the volume fraction or the weight density of conductive material 182 in the peripheral heater regions 250*a* and 250*d* may be at least 200%, 100%, 10% or 1% more than that of the conductive material 182 in the central heater regions 250*b* and 250*c*. In other embodiments, the conductive material 182 may be deposited or processed to a thickness of approximately 200 µm in the peripheral heater regions 250*a* and 250*d*, but may deposited or process to a thickness of approximately 0.5 µm in the central heater regions 250*b* and 250*c*. Such configurations may enable the heater 170*f* to heat the feedstock 110 in the peripheral regions 109*a*" and 109*d*" to the target temperature faster or from a lower initial temperature with a particular input current from the external power source (not shown) when compared to feedstock 110 in the central regions 109*b*" and 109*c*".

Additionally, certain devices may introduce new feedstock 110 via one end of the container 102 as feedstock 110 is consumed to form the structure 120 during a build process. Such new feedstock 110 may generally be at a lower temperature than the feedstock 110 already within the container 102. In such embodiments, the device 100 may receive new feedstock 110 via an inlet proximate to a first end 258 of the build area 108 and the conductive material 182 in the heater regions 250*a* and 250*b* positioned to heat the regions 109*a*" and 109*b*" proximate to the first end 258 may be of a type with greater conductivity and/or may be deposited or processed to a higher concentration, a greater thickness and/or a higher surface roughness when compared to the conductive material 182 in the heater regions 250*c* and 250*d* positioned and configured to heat the regions 109*c*" and 109*d*" distant from the first end 258. Such configurations may enable the heater 170*f* to generate a greater amount of heat energy in heater regions 250*a* and 250*b* heat the feedstock 110 in the regions 109*a*" and 109*b*" to the target temperature (or above the threshold temperature) faster or from a lower initial temperature with a particular input current from the external power source (not shown) when compared to the regions 109*c*" and 109*d*".

In other embodiments, the heater regions may be constructed to have different power densities and/or different sheet resistances in different configurations, such that different heater regions than those described above include the conductive material 182 deposited in an amount or concentration to generate higher heat energy versus to generate lower heat energy. Additionally, as described above, other embodiments may include more or fewer heater regions, may include heater regions arranged in different configurations, and may include heater regions having different shapes and different dimensions.

In some embodiments, the device 100 may include one or more other heating devices separate from the heater 170. For example, the device 100 may include one or more non-contact heaters (not shown) positioned within the build chamber 101 but not directly contacting the feedstock 110. Non-contact heating devices may include IR heaters, ceramic heaters, fan heaters and convection heaters for example. In other embodiments, the device 100 may further include one or more contact heaters (not shown) positioned on or within the sidewalls 104 or the bottom wall 106 of the container 102 and in direct contact with the feedstock 110 but which do not form a part of the interface assembly 160. These other heating devices may also communicate with the controller 310, and may be configured to receive heater signals sent by the controller 310 to control one or more of the intensity or amount of heat energy generated, and a duration and a start time of a heating interval during a build cycle.

In some embodiments, the at least one layer of the interface assembly 160 comprises more than one layer and may include layers additional to the heater 170. For example, referring to FIGS. 9-11, some embodiments of the interface assembly 160 include at least one separating layer 260. The separating layer 260 may be constructed and configured to protect other layers of the interface assembly 160 from damage as forces are exerted on (or otherwise experienced by) the interface assembly 160 during a plurality of build cycles and over multiple build processes and to reduce adherence of a newly polymerized layer 122 to the build surface 164.

Figure 9:
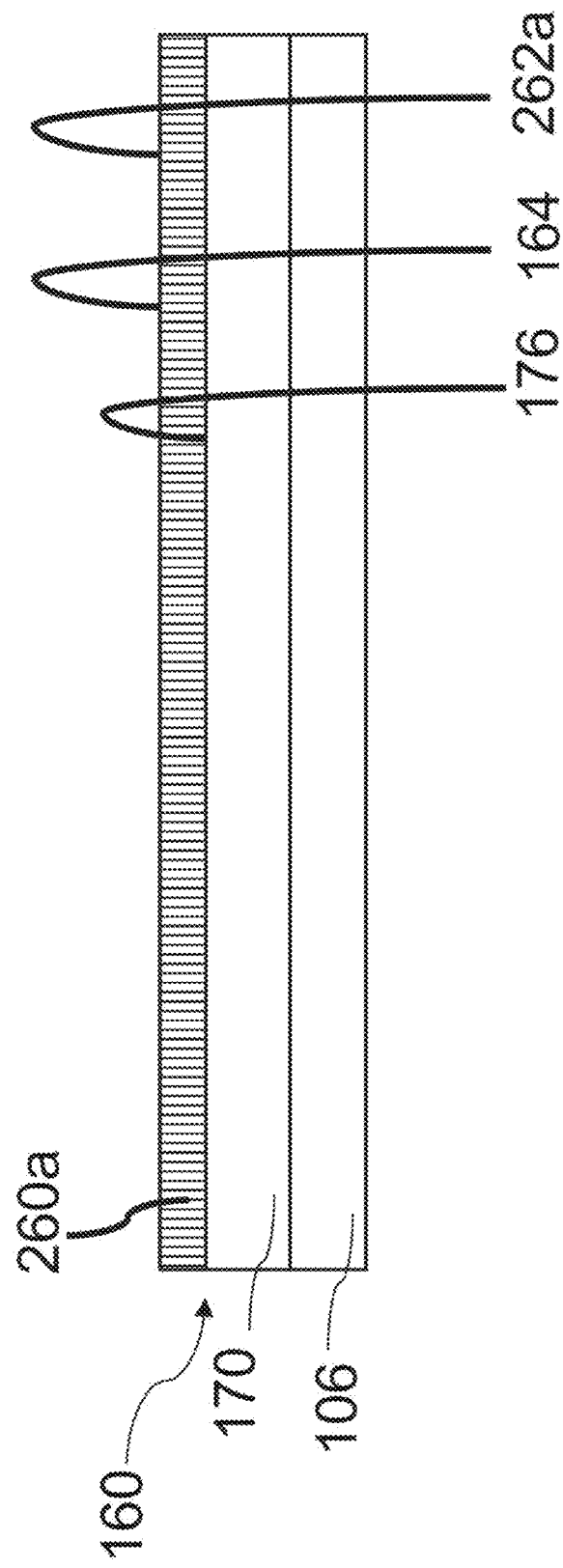
FIG. 9 is a schematic of an interface assembly of the additive manufacturing device of FIG. 1 according to another embodiment.

In the embodiment shown in FIG. 9, the at least one separating layer 260 comprises an upper separating layer 260*a* positioned above the heater 170 such that the heating interface 176 contacts a bottom surface of the upper separating layer 260*a*. The upper separating layer 260*a* forms a top layer of the interface assembly 160, such that a top surface 262*a* of the upper separating layer 260*a* forms the build surface 164 and is configured to be in direct contact with the feedstock 110. The upper separating layer 260*a* may be constructed or configured to protect the heater 170 from damage from forces exerted on (or otherwise experienced by) the interface assembly 160. Additionally, as the top surface 262*a* forms the build surface 164, the upper separating layer 260*a* may also be constructed and configured to reduce adherence between a newly polymerized layer 122 and the build surface 164.

In the embodiment shown in FIG. 10, the at least one separating layer 260 comprises a lower separating layer 260*b* positioned below the heater 170, such that a top surface 262*b* of the lower separating layer 260*b* contacts the bottom surface 175 of the heater 170. The lower separating layer 260*b* may protect the heater 170 from damage due to contact with other components of the interface assembly 160 underneath it and/or with the bottom wall 106 as forces are exerted on (or otherwise experienced by) the interface assembly 160. The lower separating layer 260*b* may also protect any layers of the interface assembly 160 positioned underneath it (such as the structural layer 270 shown in FIG. 12) from damage due to forces exerted on (or otherwise experienced by) the interface assembly 160.

In some embodiments, the at least one separating layer 260 of a particular interface assembly 160 may include more than one separating layer 260. For example, some embodiments of the interface assembly 160 may include both the upper separating layer 260*a* positioned above the heater 170 and the lower separating layer 260*b* positioned below the heater 170. Alternatively, in the embodiment shown in FIG. 11, the at least one separating layer 260 comprises a first separating layer 260*c* positioned above the heater 170 and an adjacent second separating layer 260*d* positioned above the first separating layer 260*c*. The first and second separating layers 260*c* and 260*d* may be coupled at a separating layer interface 264 where a top surface 262*c* of the first separating layer 260*c* contacts a bottom surface of the second separating layer 260*d*. The second separating layer 260*d* forms a top layer of the interface assembly 160 and a top surface 262*d* of the second separating layer 260*d* forms the build surface 164 of the interface assembly 160 and is configured to be in direct contact with the feedstock 110.

Using two adjacent separating layers 260*c* and 260*d* may provide additional protection for the heater 170 from damage by forces exerted on (or otherwise experienced by) the interface assembly 160. Additionally, using adjacent separating layers 260*c* and 260*d* may facilitate detachment of certain layers of the interface assembly 160 from other layers at the separating layer interface 264 to allow any detached layers to be replaced. In the embodiment shown in FIG. 11, the second separating layer 206*d* may be detached from the remaining layers of the interface assembly 160 (including the first separating layer 260*c* and the heater 170) at the separating layer interface 264 and may be replaced without replacing any other layers of the interface assembly

160. To facilitate detachment of the second separating layer 260*d* from the first separating layer 260*c*, the container 102 may include a bottom portion 266 configured to retain the first separation layer 260*c* and the heater 170 and a top portion 267 configured to retain the second separating layer 260*d*. The bottom and top portions 266 and 267 may be removably coupled to each other, such as through a detachable mechanical connection or a reusable adhesive for example. Decoupling the top portion 267 from the bottom portion 266 facilitate detachment of the second separating layer 260*d* from the first separating layer 260*c* at the separating layer interface 264. The detached second separating layer 260*d* may then be replaced with a new second separating layer 260*d*. Re-coupling the top portion 267 to the bottom portion 266 may then attach the new second separating layer 260*d* to the first separating layer 260*c* at the separating layer interface 264.

Alternatively, in some embodiments, the interface assembly 160 may include both the first and second separating layers 260*c* and 260*d* positioned above the heater 170, as well as the lower separating layer 260*b* (shown in FIG. 10) positioned below the heater 170.

Figure 10:
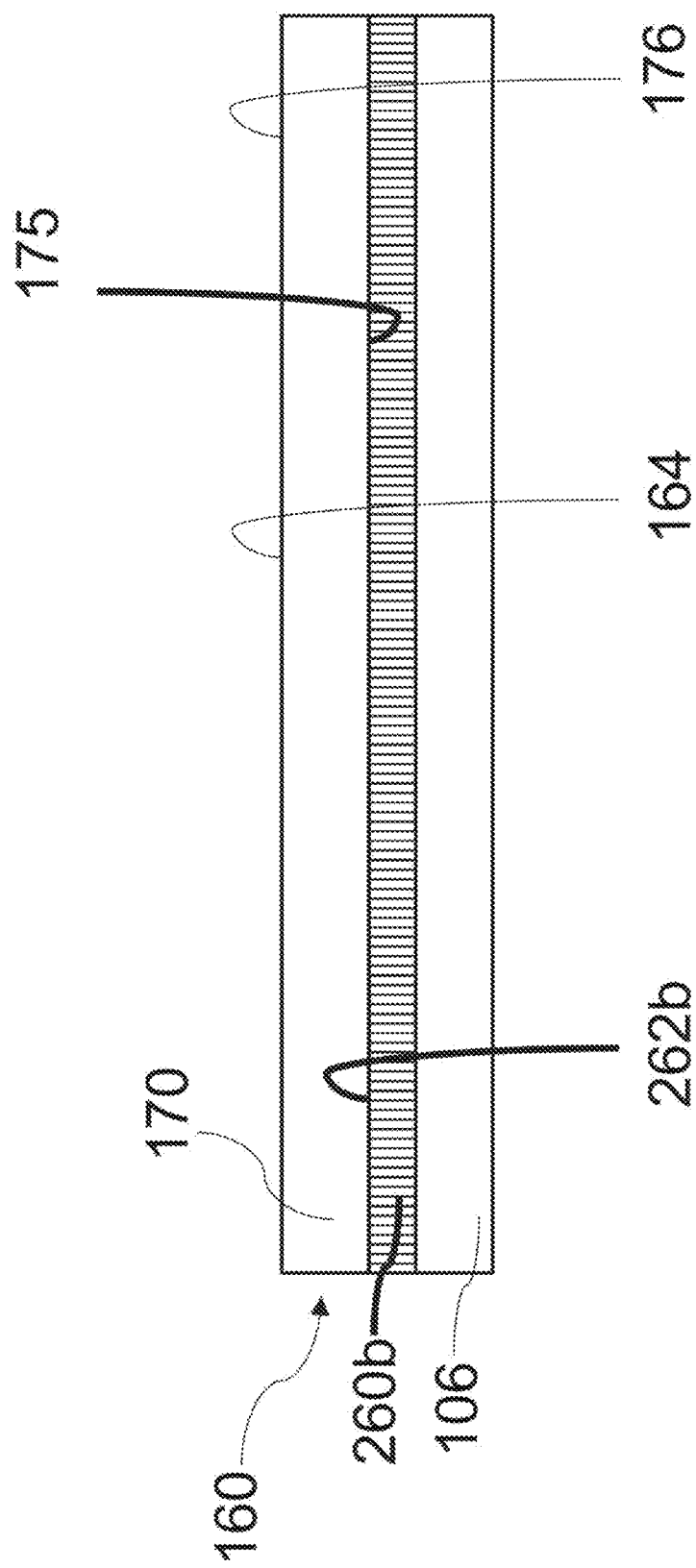
FIG. 10 is a schematic of an interface assembly of the additive manufacturing device of FIG. 1 according to another embodiment.
Figure 11:
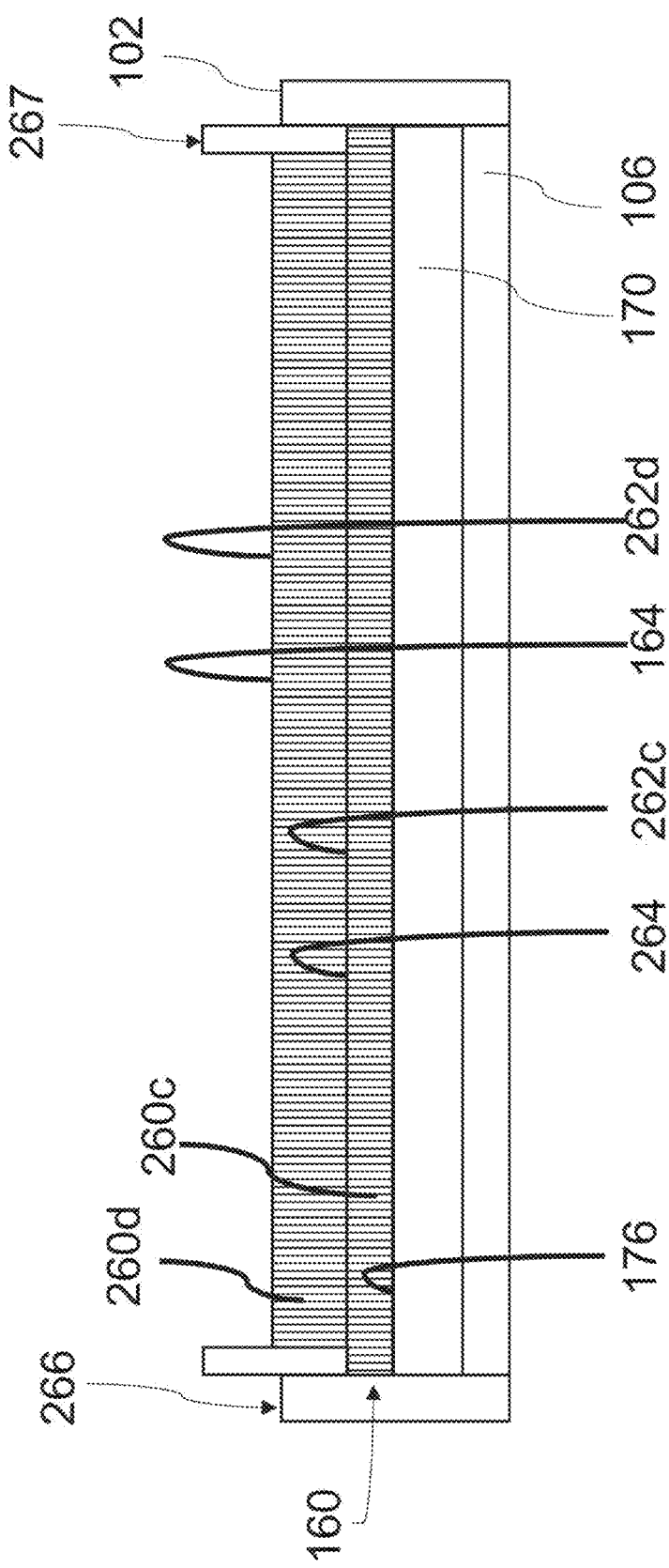
FIG. 11 is a schematic of an interface assembly and a container of the additive manufacturing device of FIG. 1 according to another embodiment.

As the separating layer 260 (such as the upper separating layer 260*a*, the lower separating layer 260*b*, the first separating layer 260*c* and the second separating layer 260*d* shown in FIGS. 9-11 for example) forms a part of the interface assembly 160, the separating layer 260 may also need to satisfy the transparency threshold, the flexibility threshold and the durability threshold required for use in the device 100, either individually or collectively with the other layers of the interface assembly 160 (including the heater 170 for example). Additionally, for the separating layer 260 to protect the heater 170 (or other layers of the interface assembly 160 positioned underneath it), the separating layer 260 may be constructed of more durable material than the heater 170 (or the other layers) and may be required to satisfy a higher flexibility threshold or higher durability threshold than the heater 170. In embodiments where the separating layer 260 forms the top layer of the interface assembly 160 (such as the upper separating layer 260*a* shown in FIG. 9 and the second separating layer 260*d* shown in FIG. 11), a top surface (such as the top surfaces 262*a* and 262*d*) of the separating layer 260 functions as the build surface 164 and the separating layer 260 may also be constructed and configured to reduce adherence of a newly polymerized layer 122 to the build surface 164.

Similar to the heater 170, the separating layer 260 may satisfy the transparency threshold, the higher flexibility threshold or the higher durability threshold by its construction or configuration. The separating layer 260 may also provide its protective functions or its adherence reduction functions by its construction or configuration. Non-limiting examples of materials which may form a separating layer 260 which satisfies the above thresholds and provides the above functions include PET, poly(ethene-co-tetrafluoroethene) (ETFE), FEP, TPX, Teflon AF2400, Teflon AF1600, fluoropolymers, silicone, silicone hydrogel, and hydrogel. In embodiments of the interface assembly 160 including more than one separating layer 260, the different separating layers may be made of a same material or may be made of different materials. The separating layer 260 may also be of various thicknesses, and the thickness may range between approximately 25 µm and approximately 6000 µm. In embodiments including more than one separating layer 260, the different separating layers may have a same thickness or different thicknesses. Alternatively or additionally, the separating layer 260 may also be constructed or configured to be replaced after a particular number of build cycles, or after it becomes damaged from use, or after it no longer satisfies the transparency threshold and/or the flexibility threshold.

Further, in embodiments where the separating layer 260 is positioned above the heater 170 (such as the upper separating layer 260*a* shown in FIG. 9 and the first and second separating layers 260*c* and 260*d* shown in FIG. 11), the heating interface 176 may be in contact with the bottom surface of the separating layer 260 rather than the feedstock 110 at the reaction interface 112. In such embodiments, the separating layer 260 may also be constructed or configured such that heat energy generated by the heater 170 is substantially transferred from the bottom surface to the top surface of the separating layer 260 and to the feedstock 110 at the reaction interface 112. For example, the separating layer 260 may comprise a highly thermal conductive material, such as one or more of graphene, silver nanowires and aluminum oxynitride. Additionally, the separating layer 260 may have a thickness of less than approximately 5000 µm.

The separating layer 260 may also be tensioned. For example, the second separating layer 260*d* (shown in FIG. 11) may be mechanically tensioned upon installation in the top portion 267 of the container 102. Tension in a particular separating layer 260 may be at least approximately 50 Hz and may range between approximately 50 Hz and approximately 500 Hz. A separating layer 260 under high-tension (i.e. high frequency) may encourage the interface assembly 160 to form a flat configuration of the build surface 164 after forces are exerted on (or otherwise experienced by) the interface assembly 160 during the pre-exposure and post-exposure stages (such as the pre-exposure stages 340*a* and 340*b* and the post-exposure stages 360*a* and 360*b* shown in FIG. 13) of build cycles, but may be more prone to damage over a plurality of build cycles and may be more difficult to separate from a newly polymerized layer 122. A separating layer 260 under a low tension (i.e. low frequency) or no tension may more slowly reform the flat configuration of the build surface 164, but may be more durable and may more easily separate from a newly polymerized layer 122. In embodiments including more than one separating layer 260, each separating layer may be under a same tension or different tensions. For example, separating layers 260 configured to be positioned above the heater 170 (the upper separating layer 260*a* in FIG. 9 and the first and second separating layers 260*c* and 260*d* in FIG. 11) may be tensioned higher than those configured to be positioned below the heater 170 (the lower separating layer 260*b* shown in FIG. 10).

Some embodiments of the interface assembly 160 may further include at least one structural layer 270. The structural layer 270 may (a) provide structural support to layers of the interface assembly 160 positioned above it, (b) encourage the interface assembly 160 to form the flat configuration of the build surface 164 after forces are exerted on (or otherwise experienced by) the interface assembly 160 and (c) maintain the build surface 164 in the flat configuration during the polymerization of the feedstock 110. The build surface 164 having the flat configuration may provide for more accurate polymerization of the feedstock 110 according to a particular shape and a particular configuration based on a received frame (such as the frame in the frame signals 253 shown in FIG. 1), as the radiation emitted by the radiation source 130 is less likely to be distorted as it travels through the interface assembly 160.

Figure 12:
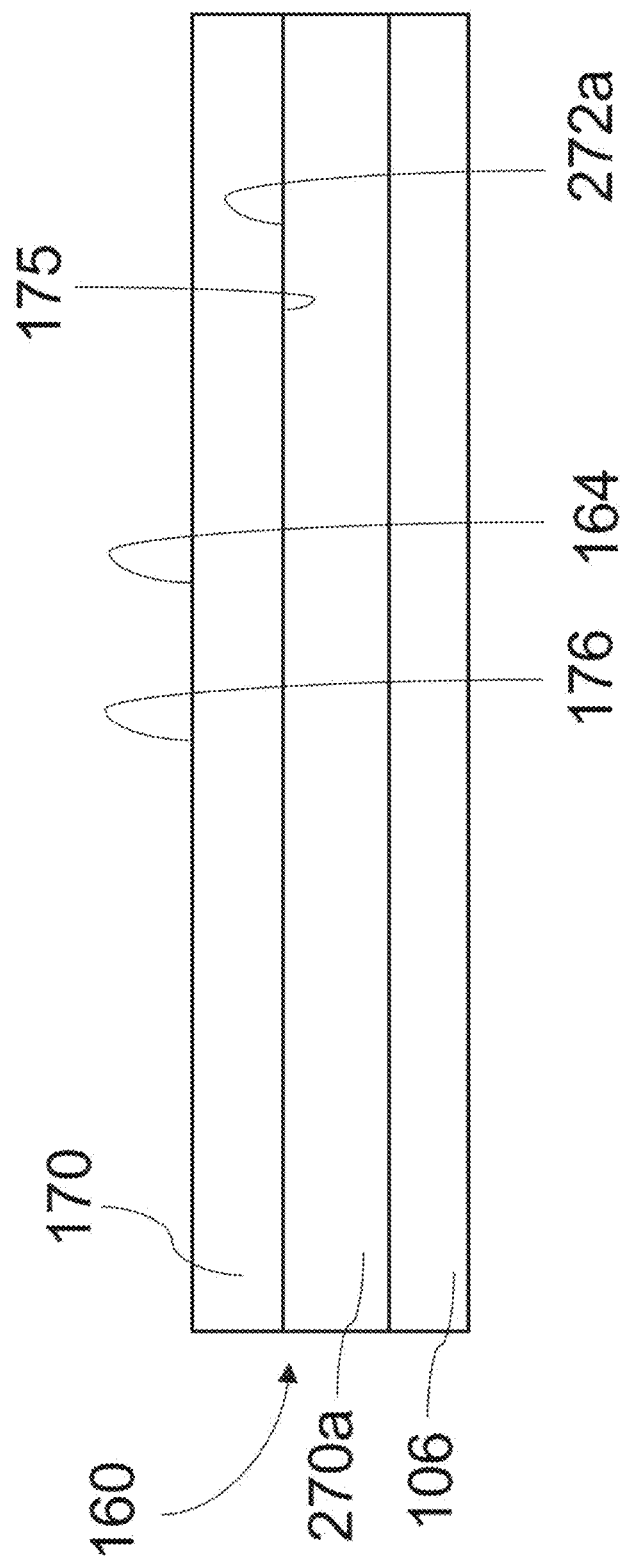
FIG. 12 is a schematic of an interface assembly of the additive manufacturing device of FIG. 1 according to another embodiment.

In the embodiment shown in FIG. 12, the at least one structural layer 270 comprises a lower structural layer 270*a* positioned as a bottom layer of the interface assembly 160, such that a bottom surface of the structural layer 270a contacts a top surface of the bottom wall 106. In the embodiment shown, a top surface 272a of the lower structural layer 270a contacts the bottom surface 175 of the heater 170. In other embodiments, the at least one structural layer 270 may include more than one structural layer 270. For example, the interface assembly 160 may include both an upper structural layer (not shown) positioned above the heater 170 and the lower structural layer 270a positioned below the heater 170. In yet other embodiments, the interface assembly 160 may include the at least one structural layer 270, the at least one separating layer 260 and the heater 170. For example, the interface assembly 160 may include the upper separating layer 260a (shown in FIG. 9) positioned above the heater 170, the lower separating layer 260b (shown in FIG. 10) positioned below the heater 170 and the lower structural layer 270a positioned below the lower separating layer 260b. As an additional example, other embodiments of the interface assembly 160 may include the first and second separating layers 260c and 260d (shown in FIG. 11) positioned above the heater 170 and the lower structural layer 270a positioned below the heater 170.

As the structural layer 270 (such as the structural layer 270a shown in FIG. 12) forms a part of the interface assembly 160, the structural layer 270 may also need to satisfy the transparency threshold, the flexibility threshold and the durability threshold required for use in the device 100, either independently or collectively with the other layers of the interface assembly 160 (including the heater 170 and the at least one separating layer 260 for example). Additionally, as the structural layer 270 is configured to provide structural support for the layers of the interface assembly 160 positioned above it and to encourage the formation of the flat configuration of the build surface 164, the structural layer 270 may be required to be sufficiently rigid to support the other layers of the interface assembly 160 and the feedstock 110.

Similar to the heater 170 and the separating layer 260, the structural layer 270 may satisfy the transparency threshold, the flexibility threshold and the durability threshold by its construction or configuration. The structural layer 270 may also provide its support functions and possess its rigidity by its construction or configuration. Non-limiting examples of materials which may be used to form a structural layer 270 which satisfies the above thresholds and provides the support function and rigidity include mineral oil, silicone, silicone hydrogel, silicone putty, oleo gel and hydrogel. The structural layer 270 may also have a thickness ranging from approximately 1 mm to approximately 30 mm.

In some embodiments, a top surface (such as the top surface 272a shown in FIG. 12) of the structural layer 270 may have adhering features and may be constructed and configured to adhere to a bottom surface of an adjacent layer of the interface assembly 160. For example, the top surface may have an adhesive or other tacky material thereon. Alternatively, the top surface may have adhering features which interact with corresponding adhering features on the bottom surface of the adjacent layer. For example, in the embodiment shown in FIG. 12, the top surface 272a of the structural layer 270a may have adhesive material and the bottom surface 175 of the heater 170 may have a microstructure texture; the combination of the adhesive material and the surface texture may promote strong adhesion between the top surface 272a and the bottom surface 175. In other embodiments, the top surface of the structural layer 270 may also have a microstructure texture, and may be corona-treated to generate surface prints or other surface texture which may function as the adhering features. Such adhering features may be useful in embodiments of the interface assembly 160 where certain layers of the interface assembly 160 are detachable from the remaining layers. For example, in embodiments of the interface assembly 160 including the first and second separating layers 260c and 260d (shown in FIG. 11) positioned above the heater 170 and the lower structural layer 270a positioned below the heater 170, adhering features on at least one of the top surface 272a of the lower structural layer 270a and the bottom surface 175 of the heater 170 promoting strong adherence therebetween may facilitate detachment of the second separating layer 260d at the separating layer interface 264 without damage to other layers of the interface assembly 160 due to comparably weak adherence between the first and second separating layers 260c and 260d.

Referring back to FIG. 1, some embodiments of the device 100 further include the sensing device 280 configured to sense the temperature of the feedstock 110. The sensing device 280 may send the sensed temperature to the controller 310 as temperature data signals 255. In certain embodiments, the sensing device 280 may sense a temperature of the feedstock 110 continuously. In other embodiments, the sensing device 280 may be configured to start sensing a temperature of the feedstock 110 at a particular start time (a "sensing start time") during a build cycle and for a particular duration (a "sensing interval"), and may only send the temperature data signals 255 to the controller 310 during the sensing interval. The sensing device 280 may be responsive to start time and interval components of sensor signals 254 sent by the controller 310 to begin sensing the temperature of the feedstock 110 at a particular start time in a build cycle and to continue sensing for a particular duration, and the start time and interval components may be based at least in part on the stage (such as the pre-exposure stages 340a and 340b, exposure stages 350a and 350b and the post-exposure stages 360a and 360b shown in FIG. 13) of a build cycle.

In some embodiments, the sensing device 280 may be non-contact sensors (not shown) positioned within the build chamber 101 and configured to sense a temperature of the feedstock 110 without directly contacting the feedstock 110. Such non-contact sensors include IR temperature sensors for example. In other embodiments, the sensing device 280 may be contact sensors (not shown) configured to sense the temperature of the feedstock 110 by contacting the feedstock 110. The contact sensors may be positioned on or within the sidewalls 104 or the bottom wall 106 of the container 102. Contact sensors may include thin-film resistance temperature detectors, thermocouples, and thermistors for example. In other embodiments, the sensing device 280 may comprise a combination of at least one contact sensor and at least one non-contact sensor.

Still referring to FIG. 1, the controller 310 comprises at least one processor and an input/output interface and is configured to communicate with different components of the device 100 to receive information signals from the components and to send control signals to control the components to execute the different stages (such as the pre-exposure stages 340a and 340b, the exposure stages 350a and 350b, and the post-exposure stages 360a and 360b shown in FIG. 13) of a build cycle.

As generally described above, in the embodiment shown, the controller 310 receives and sends signals to at least the actuator 150, the heater 170, the radiation source 130 and the sensing device 280. The controller 310 may also communicate with fewer or additional components of the device 100 in embodiments which do not include one or more of the above components or which include additional components. For example, in embodiments where the device 100 does not include the sensing device 280, the controller 310 may not receive any signals from, or send any signals to, the sensing device 280.

In the embodiment shown in FIG. 1, the controller 310 may send the frame signals 253 and the emission signals 251 to the radiation source 130. The frame signals 253 may represent frames of full or partial cross-sections of a 3D model of the structure 120, and may represent a shape and configuration of the layer 122 to be formed during a particular build cycle. The frame signals 253 may selectively control the radiation source 130 to emit the radiation in a pattern that corresponds to the frame received via the frame signals 253. For example, in embodiments where the radiation source 130 comprises the laser and the galvanometer, the frame signals 253 may control the galvanometer to direct (scan) the radiation emitted by the laser according to the received frame. In embodiments where the radiation source 130 comprises the lamp and the projector, the frame signals 253 may control the projector to direct or mask portions of the radiation emitted by the lamp according to the received frame.

The emission signals 251 control the emission of the radiation by the radiation source 130. The emission signals 251 may include the intensity, interval and start time components, and may include additional or fewer components in other embodiments. The intensity component may control the intensity of the radiation emitted by the radiation source 130. The interval component may control a duration of the exposure interval (such as the exposure intervals 352a and 352b shown in FIG. 13) and the start time component may control the exposure start time (such as the exposure start times 351a and 351b shown in FIG. 13) of the radiation emitted by the radiation source 130 during a build cycle.

The controller 310 may also send the actuator signals 252 to the actuator 150. The actuator signals 252 may include the direction, start time, travel distance and position components. Other embodiments of the actuator signals 252 may include additional or fewer components.

The direction component may control the actuator 150 to move the build platform 140 in the upward direction 152 or in the downward direction 154. The direction component may be varied based at least in part on a stage of the build cycle. For example, in the pre-exposure stage (such as the pre-exposure stages 340a and 340b shown in FIG. 13) the direction component may control the actuator 150 to move the build platform 140 in the downward direction 154 and in the post-exposure stage (such as the post-exposure stages 360a and 360b shown in FIG. 13) the direction component may instead control the actuator 150 to move the build platform 140 in the upward direction 152. The start time component may control a movement start time (such as the pre-exposure movement start times 341a, 341b and 341c and the post-exposure movement start times 361a and 361b shown in FIG. 13) of the actuator 150. The travel distance component may control a distance the actuator 150 moves the build platform 140 along the travel path 156 during a particular movement interval. The position component may control the actuator 150 to move the bottom layer surface 126 of the structure 120 (or the bottom surface 142 of the build platform 140 during a first build cycle) to the layer distance 144 above the build surface 164 (best seen in FIG. 14A). The position component may be varied based on the material properties of the feedstock 110 or a temperature of the feedstock 110 sensed by the sensing device 280. For example, where the sensed temperature of the feedstock 110 is high, the position component may control the actuator 150 to move the build platform 140 to increase the layer distance 144, as the penetration depth of the radiation into the feedstock 110 may have increased and the critical energy dose of the radiation required for sufficient polymerization of the feedstock 110 may have decreased due to increased mobility of the feedstock 110. However, where the sensed temperature is low, the position component may control the actuator 150 to move the build platform 140 to decrease the layer distance 144 to ensure that the feedstock 110 at the reaction interface 112 is sufficiently polymerized during a particular build cycle.

The controller 310 may also send the heater signals 257 to the heater 170. The heater signals 257 may include the intensity, the interval and the start time components. In other embodiments, the heater signals 257 may include additional or fewer components.

The intensity component may control the intensity or the amount of heat energy generated by the heater 170. The interval component may control a duration of the heating interval (such as the heating intervals 346a and 346b shown in FIG. 13), and the start time component may control the heating start time (such as the heating start times 345a and 345b shown in FIG. 13) during a build cycle. The intensity, interval and start time components of the heater signals 257 may be varied based at least in part on the temperature of the feedstock 110 sensed by the sensing device 280. For example, where the sensed temperature is high, the heater 170 may be controlled by the intensity component to generate heat energy at a lower intensity, by the interval component to generate heat energy for a shorter interval and/or by the start time component to generate heat at a later start time in a particular build cycle or to not generate any heat during a particular build cycle. Where the sensed temperature is low, the heater 170 may be controlled by the intensity component to generate heat energy at a higher intensity, by the interval component to generate heat energy for a longer interval and/or by the start time component to generate heat energy at an earlier start time in a particular build cycle to ensure that the feedstock 110 reaches the target temperature (or exceeds the threshold temperature). The intensity, interval and start time components of the heater signals 257 may also be pre-set prior to the start of any build cycle or any build process, such as based on a type of the material of the feedstock 110 or dimensions of the structure 120 for example, and may not be responsive to the temperature of the feedstock 110.

Figure 7:
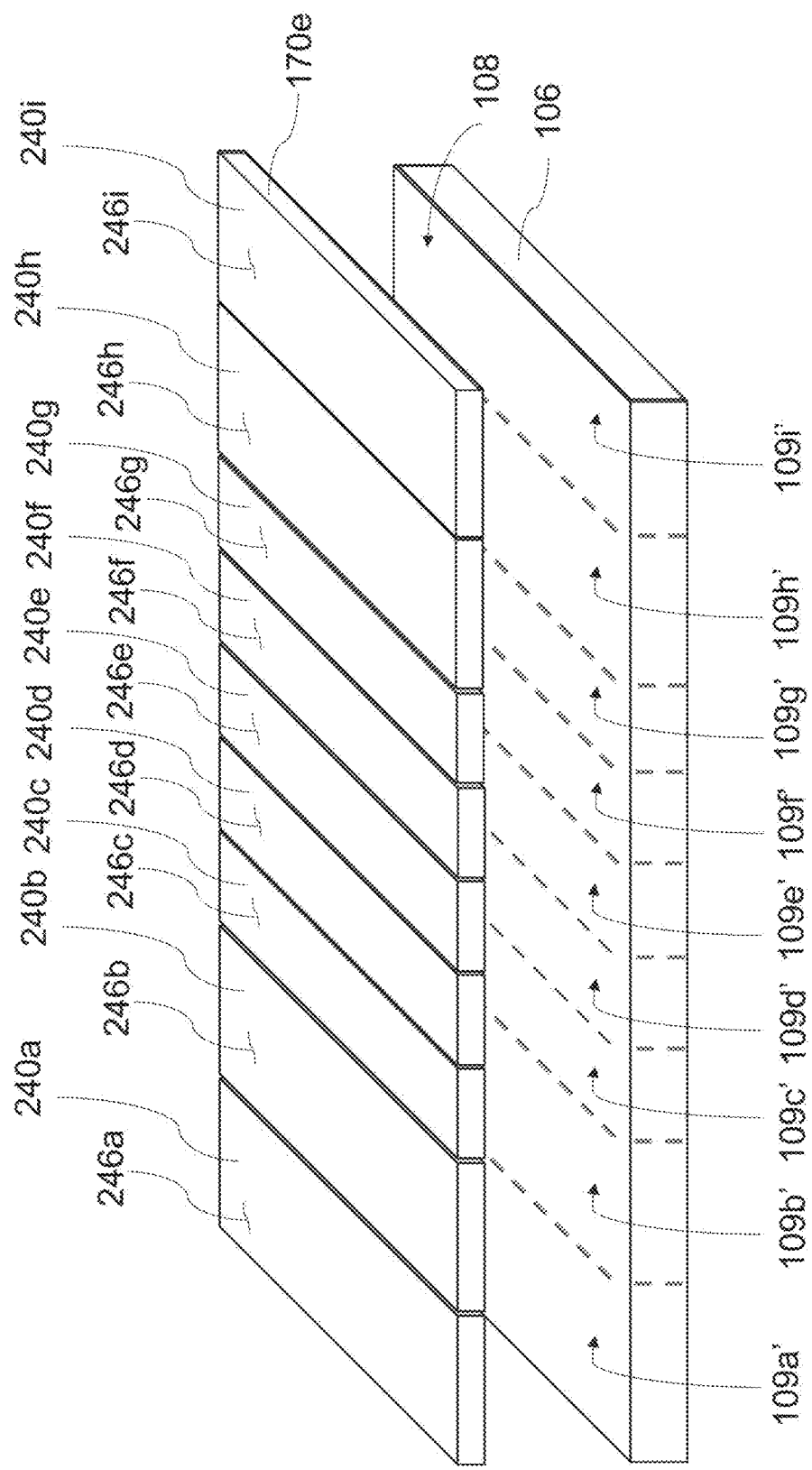
FIG. 7 is a perspective view of an interface assembly of the additive manufacturing device of FIG. 1 according to another embodiment.
Figure 8:
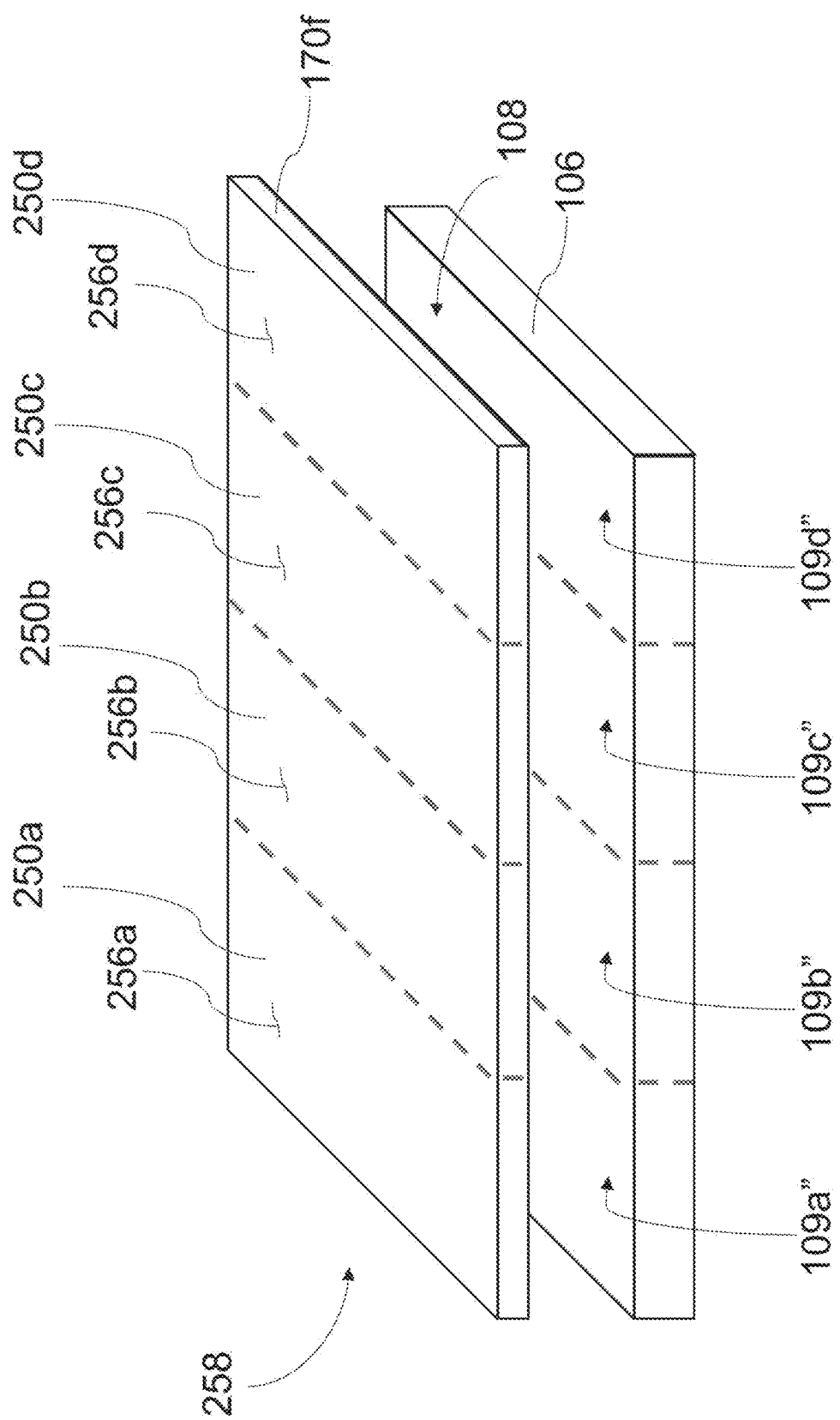
FIG. 8 is a perspective view of an interface assembly of the additive manufacturing device of FIG. 1 according to another embodiment.

In the embodiments of the heater 170 including a plurality of sub-heaters (such as the heater 170d comprising the plurality of sub-heaters 230a-230e shown in FIG. 6 and the heater 170e comprising the plurality of sub-heaters 240a-240i shown in FIG. 7) which may be controlled independently of other sub-heaters, the controller 310 may send respective heater signals 257 to each sub-heater to independently control generation of heat energy by each sub-heater. The intensity, interval and start time components of each respective heater signal 257 may be different and may be varied based at least in part on the temperature of the feedstock 110 of the associated region 109 as sensed by the sensing device 280. For example, the controller 310 may control only the sub-heater associated with a region 109 identified as a high-temperature region to decrease the heat intensity, to decrease the heating interval, to implement a later start time for heat generation, or to not generate any heat for a particular build cycle. The heater signals 257 controlling the sub-heaters associated with other regions may be controlled differently. Alternatively, the controller 310 may control only the sub-heater associated with a region 109 identified as a low-temperature region to increase the intensity of heat energy generated, to increase the heating interval, or to implement an earlier start time for heat generation. The heater signals 257 controlling the sub-heaters associated with other regions may be controlled differently.

In embodiments including the sensing device 280, the controller 310 may also send the sensor signals 254 to the sensing device 280. The sensor signals 254 may control the sensing device 280 to start and stop sensing a temperature of the feedstock material 110. In some embodiments, the sensor signals 254 may control the sensing device 280 to sense the temperature of the feedstock 110 continuously during a particular build process. In other embodiments, the sensor signals 254 may control the sensing device 280 to sense the temperature intermittently, and may include the interval and the start time components. The sensing device 280 may also send the temperature data signals 255 representing a sensed temperature of the feedstock 110 to the controller 310. In embodiments where the temperature is sensed continuously, the sensing device 280 may send the temperature data signals 255 during the build process. In embodiments where the temperature is sensed intermittently, the sensing device 280 may only send the temperature data signals 255 during the sensing intervals.

The build process 320 for building the structure 120 is shown generally in FIGS. 13 and 14A-14D. As described above, the build process 320 includes a plurality of build cycles, such as build cycles 322a and 322b. Each build cycle forms a layer 122 of the structure 120. The temperature sensed by the sensing device 280 over the build cycle 322a for polymerizing a layer 122 and over the subsequent build cycle 322b for polymerizing a subsequent layer 122 is generally shown at FIG. 13. Each build cycle 322a and 322b includes the pre-exposure stage (the pre-exposure stages 340a and 340b), the exposure stage (the exposure stages 350a and 350b) and the post-exposure stage (the post-exposure stages 360a and 360b). The build process 320 may include additional build cycles which are not depicted in FIG. 13.

The pre-exposure stage includes two intervals: (a) the pre-exposure movement interval (such as the pre-exposure movement intervals 342a and 342b) and (b) a pre-exposure delay interval (such as pre-exposure delay intervals 344a and 344b).

Figure 14A:
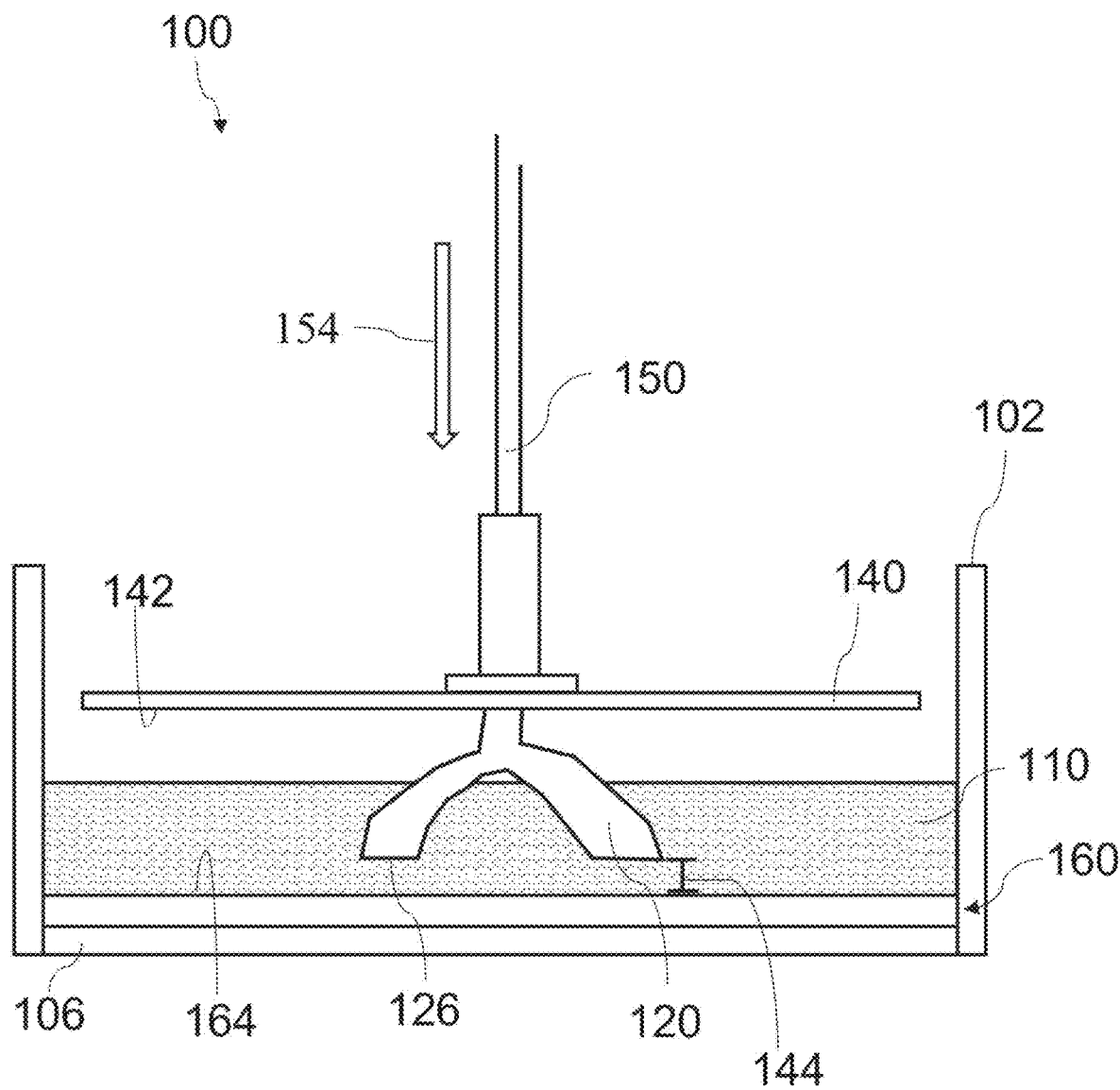
FIGS. 14A-14D are schematics of the additive manufacturing device of FIG. 1 during different stages of a build cycle according to one embodiment.

Referring now to FIGS. 13 and 14A, the pre-exposure movement interval may begin at a pre-exposure movement start time (such as the pre-exposure movement start times 341a, 341b and 341c) and continue until a pre-exposure movement stop time (such as the pre-exposure movement stop times 343a and 343b). During the pre-exposure movement interval, the actuator 150 may be controlled (such as by the actuator signals 252 shown in FIG. 1) to move the build platform 140 in the downward direction 154 towards the interface assembly 160 until the bottom layer surface 126 of the portion of the structure 120 adhered to the build platform 140 (or the bottom surface 142 of the build platform 140 during a first build cycle of the build process) is the layer distance 144 above the build surface 164. The distance that the actuator 150 moves the build platform 140 during the pre-exposure movement interval may be controlled by the travel distance component of the actuator signals 252. The layer distance 144 may be controlled by one or more of the travel distance and the position components of the actuator signals 252. In some embodiments, the actuator 150 may move the build platform 140 until the bottom layer surface 126 contacts the build surface 164. This contact may exert a compressive force in the downward direction 154 on the interface assembly 160. After this contact, the actuator 150 may move the build platform 140 slowly in the upward direction 156 until the bottom layer surface 126 (or the bottom surface 142 during the first build cycle) is the layer distance 144 above the build surface 164. Alternatively, in embodiments where both the interface assembly 160 and the bottom wall 106 are flexible, after this contact, the tensioning system (not shown) underneath the bottom wall 106 may smooth any deformation of the interface assembly 160 and force the feedstock 110 from between the bottom layer surface 126 and the build surface 164 to achieve a thin even layer of the feedstock 110 for polymerization.

Still referring to FIGS. 13 and 14A, the pre-exposure delay interval may begin at the pre-exposure movement stop time (such as the pre-exposure movement stop times 343a and 343b) and continue until the radiation source 130 emits radiation at the exposure start time (such as the exposure start times 351a and 351b). During the pre-exposure delay interval, the actuator 150 may hold build platform 140 stationary such that the bottom layer surface 126 remains the layer distance 144 above the build surface 164. In some embodiments, the exposure start time may be triggered based at least in part on the sensing device 280 detecting that the feedstock 110 has reached a target temperature (or has exceeded a threshold temperature), and in such embodiments, the duration of the pre-exposure delay interval may be based at least in part on the real-time temperature of the feedstock 110. In other embodiments, the duration of the pre-exposure delay interval may be pre-set prior to the start of the build cycle. For example, the exposure start time may be a set amount of time after the pre-exposure movement stop time, after a heating start time (such as heating start times 345a and 345b) or after a heating stop time (such as heating stop times 347a or 347b).

The heater 170 may be controlled (such as by the heater signals 257 shown in FIG. 1) to apply heat to the feedstock 110 at the reaction interface 112 for a particular heating interval (such as the heating intervals 346a and 346b) beginning at the heating start time and ending at the heating stop time during the pre-exposure stage. The intensity or the amount of heat energy generated during the heating interval and the duration of the heating interval may be controlled by the intensity and interval components of the heater signals 257. In some embodiments, the heating start time, the heating stop time, and the intensity of heat energy generated may be based on a real-time temperature of the feedstock 110. For example, the heating start time may be triggered by the sensing device 280 detecting that the feedstock 110 has fallen below a particular temperature, and the heating stop time or a reduction in the intensity of heat energy generated may be triggered by the sensing device 280 detecting that the feedstock 110 has reached the target temperature (or has exceeded the threshold temperature). In other embodiments, the heating start time, the heating stop time and the intensity of heat energy generated may be pre-set prior to the start of the build cycle, and may be based on a type of the material of the feedstock 110 or dimensions of the structure 120 for example. For example, the heating start time during the pre-exposure stage may be a pre-set amount of time after the pre-exposure movement start time or after the pre-exposure movement stop time, and the heating stop time may be a pre-set amount of time after the heating start time.

Figure 14B:
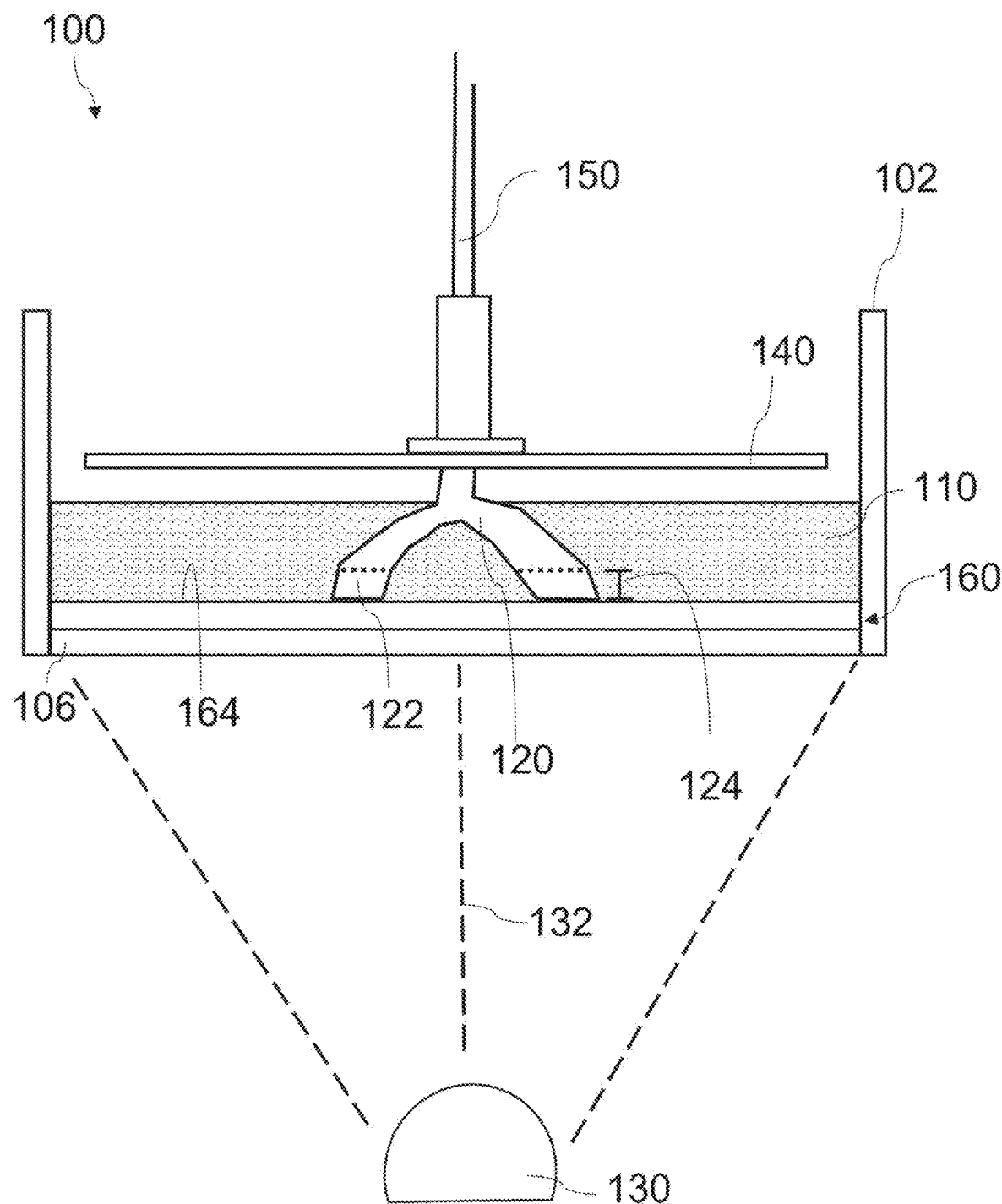

Referring now to FIGS. 13 and 14B, the exposure stage (such as the exposure stages 350a and 350b) of the build cycle may generally correspond to the exposure interval (such as the exposure intervals 352a and 352b) of the radiation emitted by the radiation source 130. In this respect, the exposure interval may begin at the exposure start time (such as the exposure start times 351a and 351b) and may continue until an exposure stop time (such as exposure stop times 353a and 353b). During the exposure interval, the radiation source 130 may be controlled (such as by the frame signals 253 and the emission signal 251 shown in FIG. 1) to emit radiation along the optical path 132 to polymerize a new layer 122 of the structure 120. The new layer 122 has the thickness 124 generally corresponding to the layer distance 144 (shown in FIG. 14A) between the bottom layer surface 126 and the build surface 164 at the pre-exposure stage. The shape and configuration of the new layer 122 may correspond to the frame received in the frame signals 253. An intensity of the radiation emitted during the exposure interval, as well as the length of the exposure interval may be controlled by, respectively, the intensity and duration components of the emission signals 251.

In some embodiments, the heater 170 may also be controlled (such as by the heater signals 257 shown in FIG. 1) to apply heat to the feedstock 110 at the reaction interface 112 for a particular heating interval beginning at a heating start time and ending at a heating stop time during the exposure stage. In embodiments where the heater 170 generates heat energy during both the pre-exposure stage and the exposure stage, the intensity of heat energy generated and the duration of the heating interval during the exposure stage may be less than those used during the pre-exposure stage, as polymerization of the feedstock 110 is generally an exothermic reaction that generates heat (as demonstrated by the temperature spike during exposure stages 350a and 350b shown in FIG. 13).

Figure 14C:
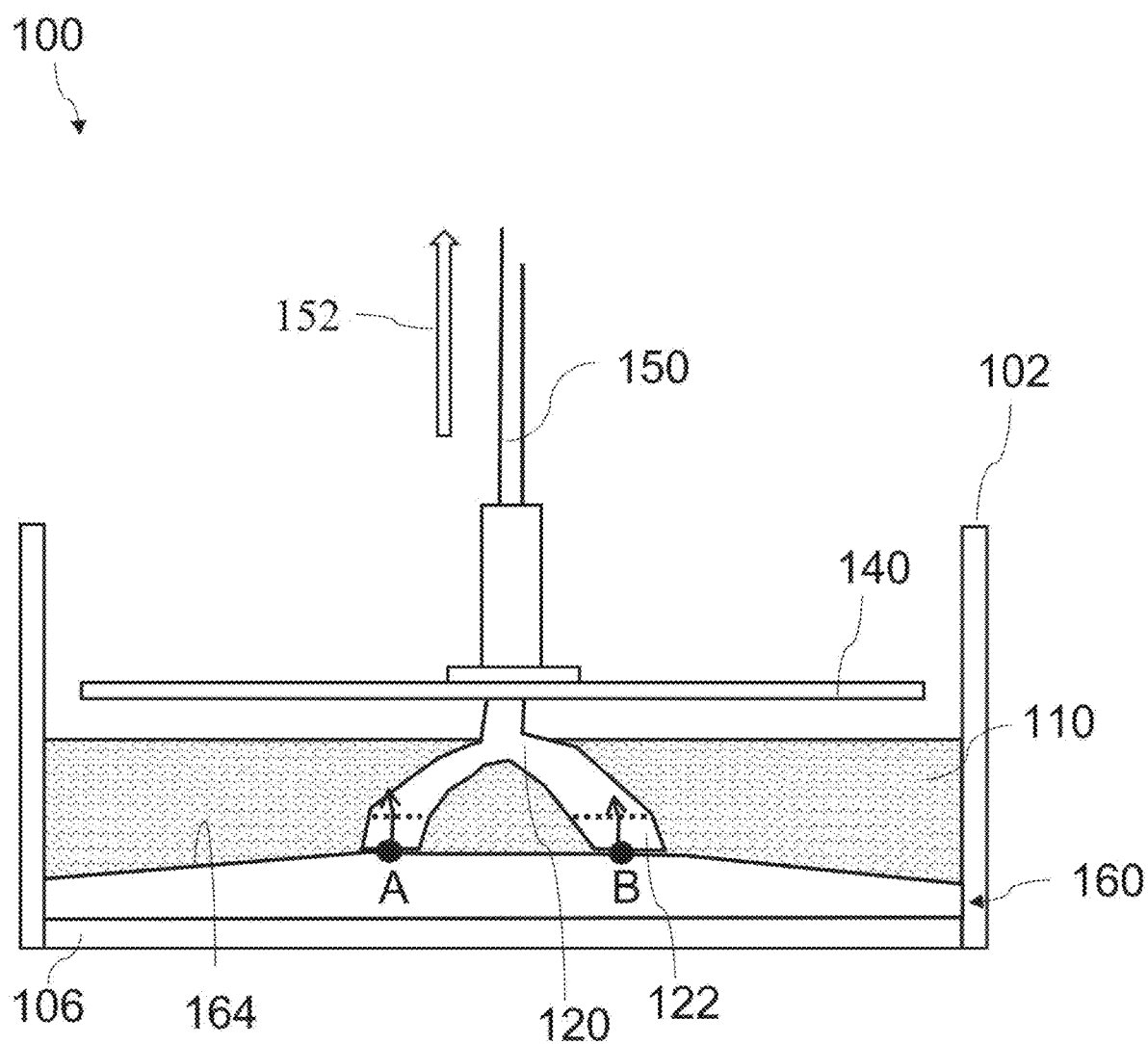
Figure 14D:
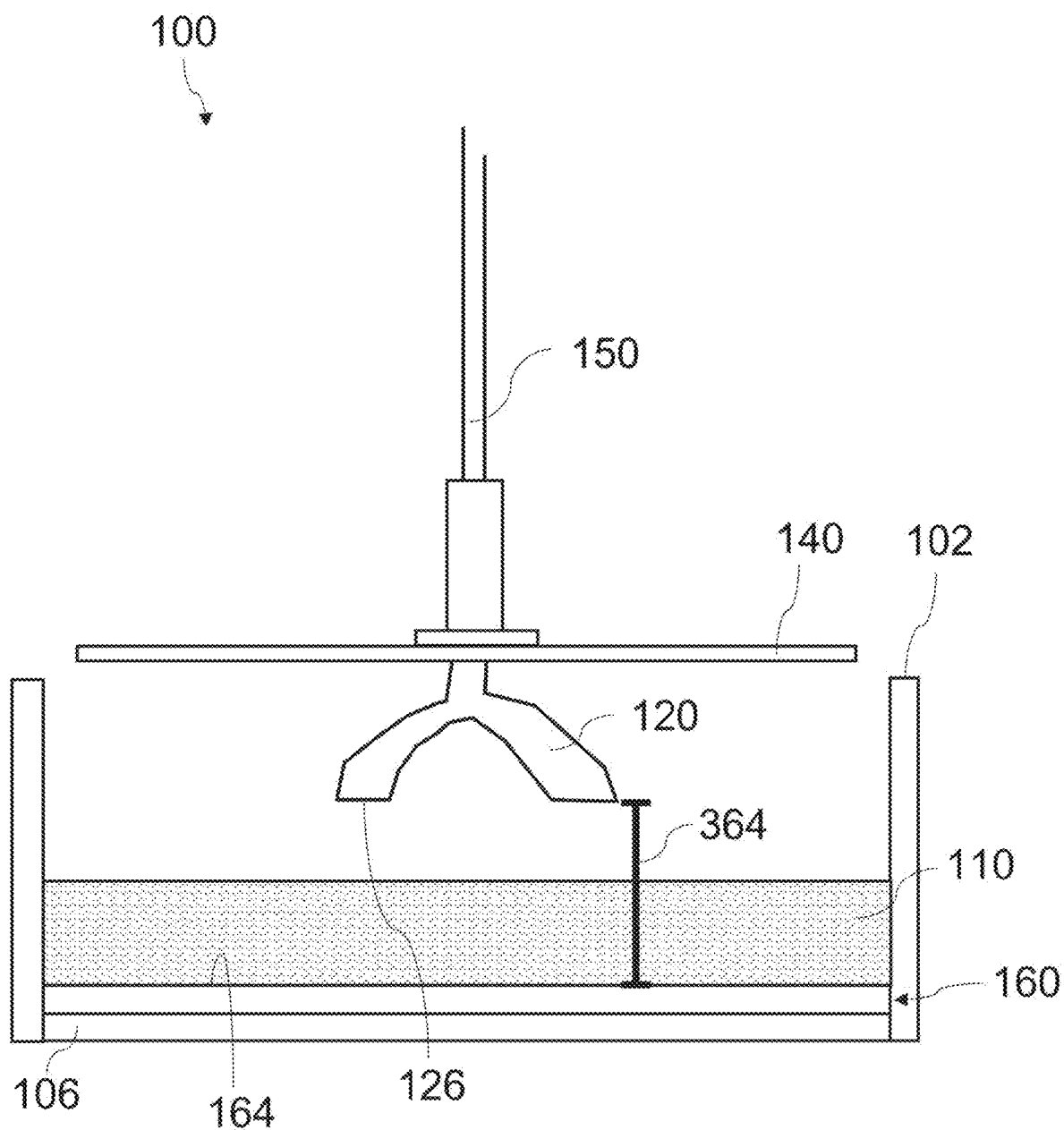

Referring now to FIGS. 14, 14C and 14D, the post-exposure stage (such as the post-exposure stages 360a and 360b) of the build cycle includes a post-exposure movement interval (such as the post-exposure movement intervals 362a and 362b). The post-exposure movement interval may begin at a post-exposure movement start time (such as the post-exposure movement start times 361a and 361b) and may end at a post-exposure movement stop time (such as post-exposure movement stop times 363a and 363b). During the post-exposure movement interval, the actuator 150 may be controlled (such as by the actuator signals 252 shown in FIG. 1) to move the build platform 140 in the upward direction 152 away from the interface assembly 160, until the bottom layer surface 126 of the newly polymerized layer 122 is a rest distance 364 above the build surface 164. The rest distance 364 may be equal to or larger than the layer distance 144 (shown in FIG. 14A). The distance that the actuator 150 moves the build platform 140 during the post-exposure movement interval may be controlled by the travel distance component of the actuator signals 252. The rest distance 364 may be controlled by one or more of the travel distance and the position components of the actuator signals 252.

As seen FIG. 14C, when the actuator 150 initially moves the build platform 140 in the upward direction 152 during the post-exposure movement interval, the newly polymerized layer 122 adheres to the build surface 164 before being separated therefrom, which may exert a tensile force in the upward direction 152 deforming the interface assembly 160. In the schematic view shown in FIG. 14C, the tensile force is exerted at least two locations A and B on the build surface 164. In other embodiments, the tensile force may be exerted on additional or fewer locations on the build surface 164 depending on the shape and configuration of the newly polymerized layer 122.

Referring back to FIG. 13, in the embodiment shown, there is a small delay between the exposure stop time (such as the exposure stop times 353a and 353b) and the post-exposure movement start time (such as the post-exposure movement start times 361a and 361b), which may provide time for the sufficient polymerization of the new layer 122 before any post-exposure movement of the build platform 140. However, in other embodiments, the exposure stop time and the post-exposure movement start time may substantially coincide.

In some embodiments, the heater 170 may also be controlled (such as by the heater signals 257 shown in FIG. 1) to apply heat to the feedstock 110 at the reaction interface 112 for a particular heating interval beginning at a heating start time and ending at a heating stop time during the post-exposure stage. The intensity of heat energy generated during this heating interval and the duration of the heating interval may be controlled by the intensity and interval components of the heater signals 257. In some embodiments, the heating start time, the heating stop time, and the intensity of heat energy generated may be based on a real-time temperature of the feedstock 110. For example, the heating start time may be triggered by the sensing device 280 detecting that the feedstock 110 has fallen below a particular temperature, and the heating stop time or a reduction in the intensity of heat energy generated may be triggered by the sensing device 280 detecting that the feedstock 110 has reached the target temperature (or has exceeded the threshold temperature). In other embodiments, the intensity of heat energy generated, the heating start time and the heating stop time may be pre-set prior to the start of the build cycle, and may be based on a type of the material of the feedstock 110 or dimensions of the structure 120 for example. For example, the heating start time during the post-exposure stage may be a pre-set amount of time after the exposure stop time, after the post-exposure movement start time or after the post-exposure movement stop time, and the heating stop time may be a pre-set amount of time after the heating start time.

Still referring to FIG. 13, after the post-exposure stage 360a of the build cycle 322a, the build process 320 may continue again from the pre-exposure stage 340b of the subsequent build cycle 322b. However, prior to initiating the pre-exposure stage 340b, the controller 310 may use the temperature data signals 255 from the sensing device 280 indicating a temperature of the feedstock 110 (in embodiments of the device 100 including the sensing device 280) to determine whether the various components of the emission signals 251, the actuator signals 252 or the heater signals 257 need to be varied as described above for the subsequent build cycle 322b. For example, in the embodiment shown, at the beginning of the pre-exposure stage 340b, the temperature data signals 255 indicate that the temperature of the feedstock 110 has increased when compared to the beginning of the pre-exposure stage 340a. The controller 310 may adjust the start time component, the duration component and the intensity component of the heater signals 257 to slightly delay the heating interval start time 345b, decrease the duration of the heating interval 346b and/or decrease the intensity of heat energy generated by the heater 170 during the heating interval 346b to account for this general increase in the temperature of the feedstock 110. In other embodiments, the adjustments to the emission signals 251, the actuator signals 252 or the heater signal 257, may be pre-set for each specific build cycle, and may be pre-set based on a type of the material of the feedstock 110 or dimensions of the structure 120 for example.

While specific embodiments have been described and illustrated, such embodiments should be considered illustrative of the subject matter described herein and not as limiting the claims as construed in accordance with the relevant jurisprudence.

The invention claimed is:

1. An additive manufacturing device comprising:
   a container for containing feedstock, the container comprising:
      an optically transparent bottom wall;
      at least one side wall; and
      a retaining portion removably attached to the at least one side wall;
   a radiation source configured to emit radiation in an optical path incident on the bottom wall; and
   an interface assembly positioned in the optical path of the radiation above the bottom wall, the interface assembly comprising:
      a heater configured to change a temperature of the feedstock proximate to a reaction interface where the radiation polymerizes at least a portion of the feedstock and constructed to meet a transparency threshold and a flexibility threshold; and
      at least one separating aver positioned above the heater and retained by the retaining portion wherein the at least one separating layer is configured to be replaced by detaching the retaining portion from the at least one side wall.

2. The additive manufacturing device of claim 1, wherein the transparency threshold comprises one or more of:
   a total transmission criteria comprising transmittance of at least 50% of an emissive spectrum of the radiation;
   a transmission haze criteria comprising scatter of less than 30% of the radiation at a wide-angle; and
   a transmission clarity criteria comprising scatter of less than 50% of the radiation at a narrow-angle.

3. The additive manufacturing device of claim 1, wherein the flexibility threshold comprises one or more of:
   a modulus criteria comprising a flexural modulus of less than 5 gigapascals (GPa); and
   a radius of curvature criteria comprising a radius of curvature equal to or less than 7 mm.

4. The additive manufacturing device of claim 1, wherein the heater is a conductive film comprising a conductive material and a substrate.

5. The additive manufacturing device of claim 4, wherein the conductive material comprises a first conductive material and a second conductive material.

6. The additive manufacturing device of claim 5, wherein:
   the first conductive material is deposited on or into a network of the second conductive material or the first conductive material and the second conductive material collectively form a network.

7. The additive manufacturing device of claim 5, wherein the first conductive material has a 1-dimensional nanostructure and the second conductive material has a 1-dimensional nanostructure.

8. The additive manufacturing device of claim 5, wherein the first conductive material has a 1-dimensional nanostructure and the second conductive material has a 2-dimensional nanostructure.

9. The additive manufacturing device of claim 5, wherein the first conductive material comprises silver nanowire and the second conductive material comprises copper microwire.

10. The additive manufacturing device of claim 5, wherein the first conductive material comprises silver nanowire and the second conductive material comprises carbon nanotube.

11. The additive manufacturing device of claim 1, further comprising a sensing device configured to sense the temperature of the feedstock.

12. The additive manufacturing device of claim 11, wherein one or more of an intensity and a duration of heat generated by the heater is based at least in part on the temperature of the feedstock sensed by the sensing device.

13. The additive manufacturing device of claim 1, wherein the heater comprises one of a plurality of heaters and each heater of the plurality of heaters is associated with a region of the bottom wall, and wherein each heater is independently controlled to heat each associated region independently of other heaters of the plurality of heaters.

14. The additive manufacturing device of claim 1, wherein the heater comprises a plurality of heater regions and each heater region of the heater is associated with a region of the bottom wall, and wherein a first heater region of the plurality of heater regions has a different power density than at least one other heater region of the plurality heater regions.

15. A method comprising:
   changing a temperature of feedstock within a container of an additive manufacturing device at a reaction interface with a heater of an interface assembly positioned above a bottom wall of the container and in the optical path of radiation emitted by a radiation source, wherein the radiation polymerizes at least a portion of the feedstock at the reaction interface and the heater is constructed to meet a transparency threshold and a flexibility threshold; and
   replacing at least one separating layer of the interface assembly positioned above the heater and retained by a retaining portion removably attached to at least one side wall of the container by detaching the retaining portion from the at least one side wall.

16. The method of claim 15, wherein the transparency threshold comprises one or more of:
   a total transmission criteria comprising transmittance of at least 50% of an emissive spectrum of the radiation;
   a transmission haze criteria comprising scatter of less than 30% of the radiation at a wide-angle; and
   a transmission clarity criteria comprising scatter of less than 50% of the radiation at a narrow-angle.

17. The method of claim 15, wherein the flexibility threshold comprises one or more of:
   a modulus criteria comprising a flexural modulus of less than 5 gigapascals (GPa); and
   a radius of curvature criteria comprising a radius of curvature equal to or less than 7 mm.

18. The method of claim 15, further comprising:
   sensing the temperature of the feedstock; and
   adjusting one or more of an intensity and a duration of heat generated by the heater based at least in part on the sensed temperature of the feedstock.

* * * * *